(12) United States Patent
Donohue et al.

(10) Patent No.: US 9,359,580 B2
(45) Date of Patent: Jun. 7, 2016

(54) METHOD FOR EXTRACTION AND PURIFICATION OF OILS FROM MICROALGAL BIOMASS USING HIGH-PRESSURE $CO_2$ AS A SOLUTE

(75) Inventors: Marc D. Donohue, Ellicott City, MD (US); Michael J. Betenbaugh, Baltimore, MD (US); George A. Oyler, Baltimore, MD (US); Julian N. Rosenberg, Naugatuck, CT (US)

(73) Assignees: THE JOHNS HOPKINS UNIVERSITY, Baltimore, MD (US); SYNAPTIC RESEARCH, LLC, Baltimore, MD (US)

( * ) Notice: Subject to any disclaimer, the term of this patent is extended or adjusted under 35 U.S.C. 154(b) by 100 days.

(21) Appl. No.: 13/816,737

(22) PCT Filed: Aug. 16, 2011

(86) PCT No.: PCT/US2011/047990
§ 371 (c)(1),
(2), (4) Date: Sep. 23, 2013

(87) PCT Pub. No.: WO2012/024340
PCT Pub. Date: Feb. 23, 2012

(65) Prior Publication Data
US 2014/0004605 A1 Jan. 2, 2014

Related U.S. Application Data

(60) Provisional application No. 61/373,997, filed on Aug. 16, 2010.

(51) Int. Cl.
| | | |
|---|---|---|
| *B01D 11/00* | (2006.01) | |
| *C11B 1/10* | (2006.01) | |
| *C11B 3/10* | (2006.01) | |
| *C10L 1/02* | (2006.01) | |
| *C11B 3/02* | (2006.01) | |

(52) U.S. Cl.
CPC ... *C11B 1/10* (2013.01); *C10L 1/02* (2013.01); *C11B 3/02* (2013.01); *C10G 2300/1011* (2013.01); *C10G 2300/1014* (2013.01); *C10G 2300/4081* (2013.01); *Y02P 30/20* (2015.11)

(58) Field of Classification Search
None
See application file for complete search history.

(56) References Cited

U.S. PATENT DOCUMENTS

| | | | |
|---|---|---|---|
| 6,056,791 A * | 5/2000 | Weidner et al. | 23/295 R |
| 6,368,836 B2 | 4/2002 | Horowitz et al. | |
| 7,485,207 B2 | 2/2009 | Corr et al. | |
| 2008/0176301 A1 | 7/2008 | Granda et al. | |
| 2010/0148117 A1* | 6/2010 | Logan | 252/182.12 |

FOREIGN PATENT DOCUMENTS

| | | | |
|---|---|---|---|
| WO | WO 9521688 A1 * | 8/1995 | B01J 2/00 |

OTHER PUBLICATIONS

Gouveia et al. 2009. Microalgae as a raw material for biofuels production. Journal of Industrial Microbiology and Biotechnology, vol. 36, pp. 269-274.*
Bligh et al., 1959. A Rapid Method of Total Lipid Extraction and Purification. Canadian Journal of Biochemistry and Physiology, vol. 37, No. 8, pp. 911-917.*
Li et al. 2006. Utilization of Carbon Dioxide From Coal-Fired Power Plant for the Production of Value-Added Products. Submitted in partial fulfillment of the requirements for the Design Engineering of Energy and Geo-Environmental Systems Course (EGEE 580.*
Patil et al. 2008. Towards Sustainable Production of Biofuels from Microalgae. Int. J. Mol. Sci., vol. 9, pp. 1188-1195.*
Nunes et al. 2011. Dense CO2 as a Solute, Co-Solute or Co-Solvent in Particle Formation Processes: A Review. Materials vol. 4, pp. 2017-2041.*
Cooney, et al., "Extraction of bio-oils from microalgae", Separation & Purification Reviews, (2009) 38: 291-325.

* cited by examiner

*Primary Examiner* — Debbie K Ware
*Assistant Examiner* — Kailash C Srivastava
(74) *Attorney, Agent, or Firm* — Johns Hopkins Technology Transfer

(57) ABSTRACT

The present invention provides methods for the isolation of oils from intact or lysed microorganisms in aqueous media with pressurized carbon dioxide as a solute. Such oils may be used for the production of biofuels. Also provided for are methods for harvesting and rupturing whole cell microorganisms in aqueous media with pressurized carbon dioxide as a solute.

14 Claims, 7 Drawing Sheets

(a)  (b)

Oil

Light Biomass

Water

Heavy Biomass

METHOD FOR EXTRACTION AND PURIFICATION OF OILS FROM MICROALGAL BIOMASS USING HIGH-PRESSURE $CO_2$ AS A SOLUTE

CROSS-REFERENCE TO RELATED APPLICATIONS

This application is a 35 U.S.C. 371 U.S. national entry of International Application PCT/US2011/047990 having an international filing date of Aug. 16, 2011, which claims the benefit of U.S. Provisional Application No. 61/373,997 filed Aug. 16, 2010, the content of each of the aforementioned applications is herein incorporated by reference in their entirety.

BACKGROUND OF THE INVENTION

1. Field of the Invention

The invention generally relates to extraction of products from microorganisms and more specifically to methods for the isolation of oils from algae in aqueous media using pressurized carbon dioxide as a solute.

2. Background Information

The biofuels industry represents an exciting opportunity to take advantage of the ability of microorganisms, and in particular algal cultures, to convert carbon dioxide and sunlight to liquid fuels including biodiesel precursors. In this way, microorganisms, especially algae, represent a potentially transformative approach towards renewable liquid fuels less harmful to the environment than fossil fuels. Indeed, microorganisms can offer the potential to capture the $CO_2$ generated by coal fired power plants, ethanol plants, petroleum refineries, and a number of other man-made and natural processes. In order to be successful in making liquid biofuels, such as biodiesel, from microorganisms, the process must become economically competitive in comparison to other alternatives including petroleum, corn-based and cellulose-based ethanol, and other advanced biofuels.

New and effective methods for extracting oils from microalgae are an important area of research and development to make algae a economically viable feedstock for lipid production. In particular, current technologies used for oil extraction require toxic organic solvents as well as expensive centrifuge steps representing nearly 50% of the total capital costs excluding systems to separate the lipid fraction from water and algal biomass. As such, the costs of the lipid purification currently represents perhaps the single most significant cost and technological barrier to algal biofuels commercialization.

Many of the current fuels and manufacturing plants have significant $CO_2$ generation that can be applied both as a feed for algal growth and as a solute to facilitate oil purification. However, the commercialization of algae biofuels will require overcoming a number of significant technological barriers. Indeed, the Department of Energy (DOE) specifically notes methods for extracting oils from microalgae as goal of research and development into algae as a source of feedstock for lipid production.

Significant barriers to implementing algal biofuels and to reaching large-scale algal biofuel production recognized by the DOE, and other federal agencies, include the ability to harvest algae and subsequently remove, or extract, and purify the useful oil from the algal cells that can then be converted to biodiesel precursors. The generation of oil-based biofuels from microorganisms requires that the oil be separated or isolated from the other components in a post growth processing system. It may be desirable to selectively purify neutral lipids as these are the most useful for conversion to a biofuel.

It is widely known that the most expensive processing steps in an algal system are harvesting by centrifugation and lipid extraction. These processes represent a significant fraction of capital costs for algal oil production. Not surprisingly, these problems and the need for solutions were noted in the 1998 National Renewable Energy Laboratory report on algal biofuels. The reasons why further research is required in the area of oil extraction are evident from previous process designs. These designs included expensive and environmentally unsound extraction processes as well as expensive centrifuge steps representing nearly 50% of the total capital costs (excluding overhead costs) to separate the lipid fraction from water and algal biomass.

As a result of the capital and operating costs of oil extraction and centrifugation steps, the expense of the oil purification currently represents perhaps the single most significant obstacle to the commercialization of methods for obtaining biofuels isolated from microorganism. These technological barriers, which give rise to the high costs are due to kinetic (viscosity and density) and thermodynamic (solubility) problems associated with the isolation of, from aqueous biomass, the oils produced or secreted by microorganisms.

There are numerous limitations to the current methods for the isolation of oil from microorganisms. Existing methods of oil extraction from algae and other microorganisms rely on toxic chemicals and/or prohibitively expensive mechanical equipment.

The most common and widely used mechanism for lipid extraction is to add a solvent to a liquid or solid state biomass. This will extract the desired lipid components into the newly-added phase. Multiple extractions are usually required in order to achieve quantitative removal of the lipid material. The extraction produces a high volume, dilute solution from which the desired lipid component then needs to be isolated by expensive distillation or other methods. In addition to the cost of these extraction processes, there are major economic and environmental disadvantages in using liquid-liquid extractions. For instance, this technique utilizes organic solvents such as acetone, pentane, or n-hexane typically obtained from petroleum sources. The process generates large volumes of organic solvents, which may be toxic, creating health hazards for workers and a negative environmental impact. The liquid solvents must either be "washed" for re-use or disposed of, and these activities detract from the goal of a sustainable and environmentally-responsible process with minimal life-cycle implications. All of these disadvantages make conventional liquid-liquid extraction processes untenable for extracting lipids from microorganisms in the long term.

Liquid-solid phase extraction using solute adsorbent materials is another alternative but the costs of these materials are likely to be even more expensive and still require some liquid solvents for isolation of the lipid material from the adsorbent.

In order to avoid the use of environmentally unfriendly chemicals in the lipid extraction processes, the use of carbon dioxide ($CO_2$) has been contemplated for extracting lipids from algae and other plant species. This technique offers a number of advantages for lipid extraction: Removal of $CO_2$ from the lipid phase is much easier than any other organic solvents since a reduction of pressure will enable rapid and inexpensive recapture and recycle of $CO_2$. $CO_2$ is a greenhouse gas but the compound is non-toxic and less harmful to the environment than liquid organic solvents. It is non-flammable (unlike organic solvents) and available at high purity. Carbon dioxide solvent can be easily recaptured for subsequent rounds of lipid extraction or fed to the algae bioreactors. $CO_2$ has a polarity comparable to liquid pentane and is, therefore, ideally suited for extracting lipophilic compounds. Indeed, $CO_2$ is non-polar and will attract non-polar lipids and oils away from water phases and biomass phases. $CO_2$ is relatively low in cost and likely to be widely available at the site of many algae based energy plants. Algae plants require $CO_2$ for growth and many are likely to be co-localized with carbon dioxide producers such as coal powered plants or ethanol plants to take advantage of the local supply of $CO_2$.

It is anticipated that the global demand for energy will double within the next 40 years. This leaves a relatively short period of time for a momentous shift in our sources of energy, and particularly a replacement for fossil fuels. Microalgae represent an incredible opportunity to generate a renewable, domestic source of biofuel compatible with our current infrastructure. Unlike terrestrial bioenergy crops, microalgae do not require fertile land or extensive irrigation, can be harvested continuously, and can be used to remediate the $CO_2$ emissions from fossil fuel combustion. One of the most significant technological and economical barriers to reaching large-scale algal biofuel production is harvesting and extracting oil from the algal cells. While the existing methods of oil extraction rely on toxic chemicals and/or prohibitively expensive mechanical equipment, the process proposed here utilizes high-pressure $CO_2$ to release the oils from the cells and promote the efficient separation of wet algal biomass into oils, water, and biomass. The projections for algal biofuel cost reduction due to this technology are significant.

To date, researchers have used supercritical $CO_2$ as a solvent for extracting lipids from algae and other plant species. The principle of supercritical extraction is essentially the same as liquid-liquid extraction except the solvent is supercritical $CO_2$ rather than pentane or n-hexane. A supercritical fluid is a substance in which the pressure and temperature are above the critical point (pressure and temperature above which fluids no longer have liquid or a vapor phase but have properties that are intermediate). $CO_2$ has a relatively low critical pressure (for example, 74 bar, 1073 psia) and temperature (32° C.) in addition to being relatively non-toxic and non-flammable. Furthermore, supercritical fluids can diffuse through materials easily like gases yet dissolve materials like a liquid, a highly useful property for an efficient extraction fluid. Supercritical $CO_2$ solvent has been used for the extraction of range of non-polar solutes including decaffeination of green coffee beans, the extraction of hops for beer production and the generation of oils and pharmaceutical products from plants. Based on its success in plants, supercritical $CO_2$ solvent has been examined for the extraction of oils from algae by researchers in previous publications.

Unfortunately, the use of supercritical $CO_2$ as an extraction solvent has one major limitation: the amount of oil that can be dissolved in supercritical $CO_2$ is in the range of 0.002% to 0.01% volume of lipid solute/volume of $CO_2$ solvent around the critical temperature and pressure. As a result, the volume of supercritical $CO_2$ solvent that is required for extracting oil from algae is multiple orders of magnitude larger than the oil volume itself. This huge increase in volume of processing will make using supercritical solvent economically impractical for commodity products like fuels due to the huge increase in processing volumes that would be required. The impracticality of using supercritical $CO_2$ solvent extraction can be demonstrated for a case study of an algae species with 40% lipid content. Assuming that the preliminary steps have dewatered the algae to the point of 50% algae and 50% water, the overall lipid content in the mixture would be approximately 20% lipid, 50% water, and 30% additional biomass. For a supercritical $CO_2$ solvent extraction designed to process 100 gallons, the amount of lipids would represent approximately 20 gallons of the total mixture. If the solubility of the lipid in the supercritical $CO_2$ is estimated at optimally 0.1% (or fraction=0.001, which is only achieved at very high pressures), then 20 gallons of lipid would require nearly 20,000 gallons of supercritical $CO_2$ for a complete extraction of the lipids from the mixture. In other words, the processing equipment for the supercritical $CO_2$ solvent alone would represent 20,000/(20,100) gallons or 99.5% of the total volume of the extraction solvent and mixture. 100 gallons of algae-water mixture would require a 20,000 gallon processing vessel in order to use supercritical $CO_2$ solvent. The capital costs associated with building vessels to accommodate a supercritical extractor representing a 200-fold expansion in the volume of the equipment relative to the algal biomass would be enormous. If capital costs increase linearly by volume the use of supercritical $CO_2$ solvent would increase the capital costs by at least 200 fold. As a result, supercritical $CO_2$ solvent extraction is likely prohibitively expensive in view of the processing volumes for extraction of low cost biofuels for the foreseeable future.

SUMMARY OF THE INVENTION

The present invention is based on the seminal discovery of a method for the isolation of oil from microorganisms in an aqueous media. The method includes adding pressurized carbon dioxide ($CO_2$) as a solute to the media containing the microorganisms, wherein $CO_2$ is dissolved in the media resulting in an oil rich phase along with other possible oil-poor phases, including a biomass phase and an aqueous phase. The method further includes removing the oil phase, thereby isolating the oil from the microorganism.

In one aspect, the present invention provides a method for harvesting whole cell microorganisms from aqueous culture medium. The method includes adding pressurized $CO_2$ to the whole cells, wherein $CO_2$ is a solute that is dissolved by the cells thereby increasing the buoyancy of the cells. The method further includes isolating the cells by centrifugation.

In another aspect, the invention provides a method to obtain oil from oil that is secreted or released from whole cell microorganisms in aqueous culture medium. The method includes adding pressurized $CO_2$ to the whole cells, wherein $CO_2$ is a solute that is dissolved by the cells thereby increasing the buoyancy of the cells. The method further includes isolating the cells by centrifugation. The method also includes subjecting the cells to rapid decompression thereby rupturing the cells to obtain three phases comprising a biomass phase, a water phase, and an oil phase. The oil phase is removed thereby isolating the oil from the microorganism.

In one aspect, a method of using $CO_2$ or a $CO_2$ and oil mixture in contact with an aqueous solution of intact cells, whereby the $CO_2$ or the $CO_2$ and oil mixture extracts or partially extracts oil from the intact cells, is provided.

In further aspects, the invention provides an oil isolated or secreted from microorganisms in an aqueous media. The method includes adding pressurized carbon dioxide ($CO_2$) as a solute to the media containing the microorganisms, wherein $CO_2$ is dissolved in the media resulting in an oil rich phase along with other possible oil-poor phases, including a biomass phase and an aqueous phase. The method further includes removing the oil phase, thereby isolating the oil from the microorganism.

In other aspects, the microorganisms of the present invention are optionally lysed or ruptured. The microorganisms may also be intact whole cells. The microorganisms may be selected from the group consisting of consisting of algae, fungi, yeast, bacteria, cyanobacteria, and plant cells. As disclosed herein, the algae may be any oil-secreting or oil-producing algae and may include *Athrospira*, Bacillariophyceae, *Chlamydomonas*, *Chlorella*, Chlorophyceae, Chrysophyceae, *Crypthecodinium*, Cyanophyceae, *Cyclotella*, *Dunaliella*, *Haematococcus*, *Nannochloropsis*, *Navicula*, *Nitzschia*, *Phaeodactylum*, *Scenedesmus*, *Schizocytrium*, *Synechococcus*, *Synechocystis*, *Tetraselmis*, *Thaustochytrids*, *Ulkenia*, Xanthophyceae, and algae that is genetically engineered to enhance or alter lipid production.

The oils may be lipids, preferably neutral lipids. The oils isolated by the methods practiced in the present invention may be used for biofuel production. The oils isolated from the microorganisms may be re-circulated back to the media containing the microorganisms to increase separation efficiency therein and to isolate additional oil from the microorganism. The re-circulated oil may be used to further purify lipids secreted or produced by the microorganisms. Other bioproducts may optionally be isolated or secreted from the microorganisms disclosed herein.

The aqueous phase may be recycled, for example, as growth medium for photosynthetic microorganisms.

In one embodiment, the whole cell microorganisms are immobilized, for example by a solid substrate.

In one aspect, the method is performed at a temperature of below about 100° C., preferably below about 50° C. The method may be continuous and may further include an instrument or apparatus, such as a centrifuge, a cyclone, or other phase separating device for phase separation.

In another aspect, $CO_2$ may be added in any amount to the media containing the microorganisms. In one embodiment, the amount of $CO_2$ added to the media containing the microorganisms is at a volume below which $CO_2$ is a solvent. For example, depending on conditions used, the ratio of $CO_2$ to the total volume of media containing the microorganisms prior to dissolution of $CO_2$ may include about twenty parts, ten parts, five parts, or two parts $CO_2$ to one part total volume of media containing the microorganisms. The source of the $CO_2$ may include a coal-fired power plant, ethanol biorefinery, or other industrial source. In certain aspects, the $CO_2$ may be removed from the oil phase and optionally recycled for post-process use.

Other aspects and features of the invention are described in more detail below.

DETAILED DESCRIPTION OF THE INVENTION

Figure 1:
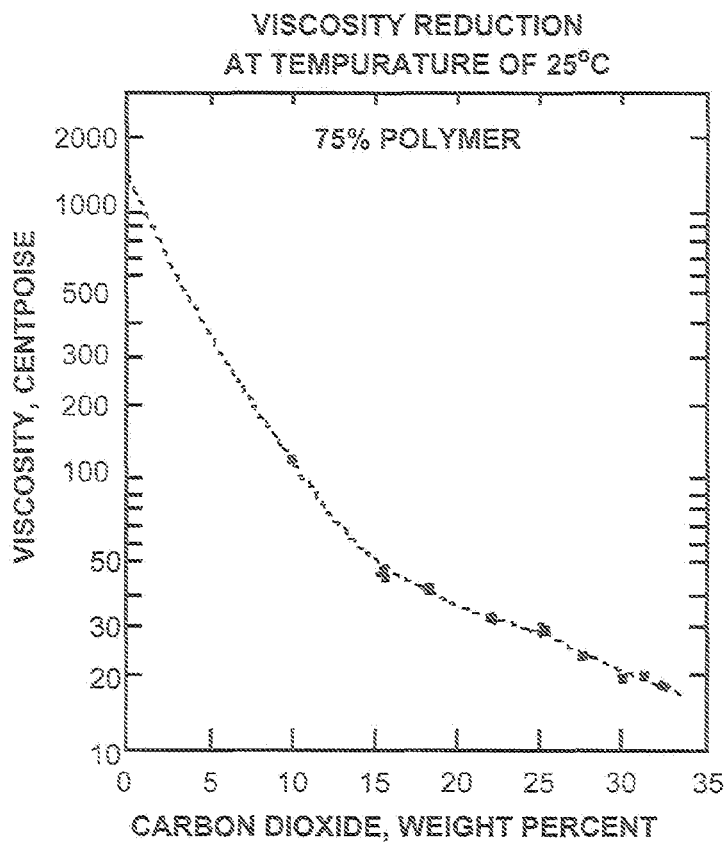
FIG. 1 is a graph which shows the reduction in viscosity following dissolution of carbon dioxide in a polymer mixture.

The present invention is based, in part, on the discovery that the dissolution of $CO_2$ in aqueous media containing microorganisms (i.e., when $CO_2$ is present as a solute) alters the kinetic (viscosity and density) and thermodynamic (phase behavior) barriers to lipid separation from biomass and water.

Unless otherwise defined, all technical and scientific terms used herein have the same meaning as commonly understood by one of ordinary skill in the art to which this invention pertains. Although methods and materials similar or equivalent to those described herein can be used in the practice or testing of the exemplary embodiments, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

As used herein "milking" and "non-destructive extraction" are used to describe a process wherein the organism is treated with a solvent to remove lipids without causing significant loss of viability of the culture. Non-destructive extraction or extraction "essentially without killing" the organism, refers to cycles of extraction and recycling/recirculating of live extracted organisms to the culture system for regrowth or additional lipid and biomass production, and to the concept that the organism will survive at least one extraction cycle, but may be destroyed upon subsequent extraction cycles.

A "culture system" refers broadly to any system useful for culturing an organism. These can be ponds, raceways, bioreactors, plastic bags, tubes, fermentors, shake flasks, air lift columns, and the like.

A "oil" refers to oil that is suitable for the production of biofuels. Such oil may or may not be completely free of coextractants from the organism. Oil described herein may include lipids, preferably neutral lipids.

As used herein a "continuous" extraction process is one in which the mixing/extracting/recycling steps occur continuously with minimal operator input for an extended period but is contemplated to be run and stopped at intervals as needed for maintenance or to maximize extraction productivity.

A "solute" refers to a substance that is dissolved in another substance, usually the component of a solution that is present in a lesser amount in the solution.

A "solvent" is a substance or material, in some cases a liquid or fluid, that is capable of dissolving another substance.

As used herein, "$CO_2$ solute" refers to $CO_2$ added in sufficient amounts to be dissolved by a substance or a system, including but not limited to biomass, whole cell or lysed microorganisms in aqueous media, oil, and/or water. As described herein, although $CO_2$ may be added in any amount, the invention methods use $CO_2$ as a solute and therefore it is not present in amounts to act as a solvent, as would be readily understood by one having ordinary skill in the art and described above.

The term "pressurized" refers to any pressure above atmospheric pressure that the microorganisms described herein tolerate or withstand. This may or may not include pressures at or above the supercritical pressure of $CO_2$. For example, the pressure is maintained below the supercritical pressure of $CO_2$.

The process of "sonication" is the treatment of a sample with high energy sound or acoustical radiation that is referred to herein as "ultrasound" or "ultrasonics." Sonication is used in the art for various purposes including disrupting aggregates of molecules in order to either separate them or permeabilize them.

Using novel chemical engineering strategies, exemplary embodiments of the invention are directed at increasing the yield of energy rich lipids that may be harvested from algae. Although many of the exemplary embodiments described below may be useful individually, the exemplary compositions, systems, and methods of the current system may work complimentarily to optimize both cost and yield.

The systems and methods disclosed herein may utilize a vast array of oleaginous organisms including alga, yeasts and fungi. Many algal species may be used in the methods of the invention. Some alga species include, without limitation: *Athrospira*, Bacillariophyceae, *Chlamydomonas, Chlorella*, Chlorophyceae, Chrysophyceae, *Crypthecodinium*, Cyanophyceae, *Cyclotella, Dunaliella, Haematococcus, Nannochloropsis, Navicula, Nitzschia, Phaeodactylum, Scenedesmus, Schizocytrium, Synechococcus, Synechocystis, Tetraselmis, Thaustochytrids, Ulkenia*, Xanthophyceae, and algae that is genetically engineered to enhance or alter lipid production.

Suitable yeasts include, but are not limited to, *Rhodotorula, Saccharomyces*, and *Apiotrichum* strains.

Acceptable fungi species include, but are not limited to, the *Mortierella* strain.

Milking Oils from Algal Cultures without Harming the Algae:

One of the major costs associated with biofuel production is harvesting the biofuel from large volumes of culture media (Becker, 1994). Harvesting, rupturing, drying and extracting oils from algae accounts for 40-60% of the cost of producing biodiesel and places additional demands on culture replenishment. There is a need for a nondestructive, low cost oil extraction technology.

Certain microalgae have a high potential for lipid production. When grown heterotrophically, approximately 15-55% of the cell is lipid. However, even though the lipid content is high, if the lipids cannot be harvested essentially without harming the microalgae, then 45-85% (the non-lipid biomass) of the microalgal biomass will need to be regenerated in order to produce additional useful lipids.

Accordingly, described herein are methods for non-destructive oil extraction from an microorganism, which include: mixing at least a portion of an aqueous culture containing an organism with $CO_2$, which acts as a solute and results in the formation of two or more phases, preferably three phases; extracting oil from the oleaginous organism to obtain an aqueous-organism mixture; obtaining an extracted aqueous fraction containing a viable extracted organism and an oil fraction; and a recycling step, in which at least a portion of the viable extracted organism is recycled into a culturing system. In an exemplary system in some ways analogous to a dairy operation, the system allows for the collection of usable oil from the oleaginous organism essentially without rupturing or harming the organism. An embodiment of the extraction process includes solvent extraction and sonication to accomplish "hydrocarbon milking" of the organism. After extraction of the usable oils, the organisms can begin a new process of accumulating lipids. The exemplary processes allows for efficient collection while at the same time preserving the viability of a portion of the cultured organisms. This saves the energy and materials that would otherwise be required to regenerate the live organisms.

Advantageously, the "milking" process may actually benefit the algae. Mixing alkanes with live cultures has also been shown to extend culture growth times from one week to more than five weeks. This effect may be associated with the partitioning of toxic waste products secreted from algae into the hydrophobic fraction of the media (Richmond, 2004).

It has been demonstrated that very hydrophobic molecules, such as beta-carotene, can be continuously extracted from live algae and bacterial cultures using non-miscible, biocompatible alkanes. These alkanes typically have carbon chain lengths between 10 and 16 atoms. Continuous mixing of algal cultures with alkanes allows for uninterrupted extraction of beta-carotene. Importantly, the extracted carotenoids come from carotenoid storage vesicles and not chloroplasts. As a result, alkane extraction has no negative impacts on long-term (50 days then stopped) culture growth.

Some exemplary embodiments disclosed herein utilize "hydrocarbon milking" as a cost-effective means for continuously harvesting oils from algae. In some embodiments, the processes described here do not require centrifugation, have a very high lipid yield, and significantly, the extraction process is essentially harmless (and may even be beneficial) to the algae. Hydrocarbon milking may eliminate the need for centrifugation/flocculation and the destructive solvent (methanol) or mechanical disruption steps typically used to extract oil from algae. In another aspect, oil secretion from the algae or other organism and removal of the oil from the media is included in the invention.

While expressly not limited to theory, sonication is believed to improve oil extraction by breaking up the culture droplets into smaller particles allowing greater solvent exposure to the algae. Ultrasonic irradiation of microorganisms without damaging effects has been shown to be dose dependent at low frequency. As frequency increases, longer irradiation is tolerated by microorganisms. We use an optimal range of frequencies (20 kHz to 1 MHz) and intensities over different ultrasonic exposure times to optimize the extraction of oils without compromising the viability of cells. However, it should be appreciated that various other frequencies, intensities, and exposure times may also yield acceptable extraction efficiencies. Exemplary embodiments of the present invention release oils essentially without killing cells. For example, ultrasonic irradiation of microorganisms without damaging effects has been shown to be dose dependent at low frequency. As frequency increases, longer irradiation is tolerated by microorganisms. An optimal range of frequencies (20 kHz to 60 Khz) and intensities over different ultrasonic exposure times may be utilized to optimize the extraction of oils without compromising the viability of cells. However, it should be appreciated that various other frequencies, intensities, and exposure times may also yield acceptable extraction efficiencies, including frequencies between 20 kHz and 1 MHz, 20-100 kHz, 20-60 Khz, 30-50 Khz, or at 40 Khz. It is known that cell size, cell shape, cell wall composition and physiological state all affect the interaction of ultrasound with cells.

Besides the usable lipids already described, plant species such as algae are also known to produce important hydrophobic aromatic compounds. Some aromatic compounds such as naphthalene and toluene are important constituents in fuel products. Advantageously, the extraction techniques described herein may be used to extract many of these aromatic compounds as well as other useful oils previously described. These chemicals would not be extractable using current extraction techniques that rely on centrifugation and drying methods. Other plant species that produce such fuel products are also included in the invention.

Although algal extraction is the focus of many of the exemplary embodiments, the growth and recycle extraction process may also be used with other important oleaginous organisms. For example, organisms such as yeast and fungi would also be amenable to this type of purification process.

The ability of $CO_2$ to act as a solute for lipids and how its presence changes the physical properties of lipids/oil is described herein. Such changes will facilitate oil removal and purification from algae biomass and water during process development. Furthermore, the manner in which the changes in physical property can alter the separation of oil from algal biomass and water has been demonstrated. Finally, it has been shown that algae with significant oil content can be grown to sufficient densities as a feed source for testing the separation process described above.

The phase behavior of $CO_2$ as a solute has been determined and demonstrated herein. Phase behavior was shown in which a single $CO_2$-oil phase is formed at pressures above 800 psia—the minimal operating pressure for future $CO_2$ solute experiments. If pressure is dropped below 800 psia, the liquid and $CO_2$ and oil are observed to separate into distinct phases. Such a phase separation is not desirable for oil isolation but will be very useful for subsequent separation of $CO_2$ solute and oil followed by recovery and recapture of liquid $CO_2$. Furthermore, mixing water, oil, and $CO_2$ leads to distinct oil-rich and water-rich phases in which the $CO_2$ is dissolved in both. Most importantly, a much greater amount of $CO_2$ dissolves in the oil phase than in the water phase leading to a significant change in physical properties discussed below. When biomass is included at high $CO_2$ pressures, four phases are formed: oil-$CO_2$, light biomass-$CO_2$ (with some oil), water, and dense biomass.

One can estimate the effect of this $CO_2$ solubilization on other physical properties of the oil phase. Solubilization of $CO_2$ in oil led to significant expansion of the oil rich phase at high density with only slight changes in the $CO_2$ content in water. Since density of liquid $CO_2$ is 15% (0.77 g/ml) lower than oil (0.92 g/ml), then we can estimate the change in density as a function of $CO_2$ content (and pressure). If the oil contains approximately 20% $CO_2$, then the density will decline from approximately 0.92 g/L to 0.89 grams per liter based on equal contributions of each component. However, the density of the mixture is likely to decrease more than this since the $CO_2$ will likely expand the mixture due differences in molecular structure of oil and non-polar $CO_2$ and an activity coefficient deviating from one. This decrease in oil phase density will lead to an improvement in the driving force for separation measured as the in Equation 1. A decrease of the oil phase density from 0.92 to 0.89 g/mL will increase the density difference ($\rho-\rho_0$) with water (1 g/mL) nearly 28%, which will facilitate the separation of oil and water.

Equally important will be the effect of $CO_2$ solute on the viscosity of the mixture. As shown in Equation 1 (Example 1), the processing rate is inversely proportional to the viscosity of the mixture so a lower viscosity will increase the oil processing rate. In previous studies, we have shown that the viscosity can change more than one order of magnitude for a 10% $CO_2$ solution in a viscous polymer solution (FIG. 1). The reason for the huge impact of $CO_2$ solubility on viscosity is due to the unusually low viscosity of $CO_2$. Liquid $CO_2$ has a viscosity of only 0.07 centipoise (cP), which is 430 times (2.5 orders of magnitude) lower than the viscosity of algae at approximate 30 cP. If we generate a 20% by volume $CO_2$-oil phase and assume that each contributes equally to the viscosity, the oil-$CO_2$ viscosity should be reduced to at least 24 cP. Such a reduction would lead to a 25% increase in processing rate, which could be critical in eliminating the need for costly chemical extraction steps.

This is a conservative estimate because the reduction of viscosity is logarithmic with % $CO_2$ as seen in FIG. 1 and likely to be even greater than this arithmetic combination. In this study, a 20% by volume increase in the oil layer was obtained with a pressure of 850 psia. Very high pressures were not used due to the glass device required for observing volume changes and cloud/bubble points. If we assume that solubility is approximately proportional to partial pressure, we can increase the amount of $CO_2$ dissolved to 40 or 50% by increasing the pressure to approximately 1600 psia. Under these conditions, the viscosity of the mixture would be reduced to even lower values and the density difference between oil and water will be expanded significantly.

Finally, in one embodiment, we have demonstrated the capacity to grow algal biomass up to a density of nearly 1 g/L. This was achieved using phototrophic growth conditions with only sunlight and $CO_2$ as a carbon source, although mixotrophic and heterotrophic conditions may also be used. Indeed, by using heterotrophic growth conditions, the lipid content goal of 50% is easily surpassed in *Chlorella sorokiniana*. If altering the oil content for varying process conditions is desirable, the cells can be grown phototrophically and still achieve a lipid content of nearly 30%. By growing the *Chlorella* in 36 L bioreactors, the technical feasibility of the growth portion has been achieved and we have a system for providing 100 grams of algal biomass with high lipid content in 50 liters of medium for the $CO_2$ solute separation process.

The phase behavior of $CO_2$-oil and $CO_2$-oil-algae mixtures was evaluated and we have estimated changes in the physical properties including density, viscosity, and solubility following the incorporation of high pressure $CO_2$ in oil and water. We have also demonstrated the capacity to grow algae with high oil content and volumes. Most importantly, these data support the hypothesis that the inclusion of $CO_2$ as a solute changes the physical properties of oil in such a way that algal lipid purification can be achieved.

The present invention provides a $CO_2$ solute technology that alters the physical properties (viscosity, density, solubility) of algal lipids (oils) in order to facilitate their purification from water and algal biomass. The technology disclosed herein is environmentally friendly using readily available $CO_2$ that is recaptured and recycled and, most importantly, less costly than current methods. Furthermore, it is important to note the distinctions between present method and current conventional approaches for lipid isolation. Specifically, our method eliminates the use of classical chemical extraction methods involving hexane or other environmentally undesirable solvents that can only be recycled through energy intensive distillation methods. Equally important, the $CO_2$ solute technology disclosed herein is fundamentally different than $CO_2$ supercritical extraction, in which $CO_2$ is used as a solvent with processing volumes that are orders of magnitude larger and as a consequence demand much higher equipment and processing costs. This application exploits readily available $CO_2$ and utilizes $CO_2$ as a solute, in contrast to a solvent, to overcome the cost and obstacles to lipid purification. The method provided herein is an integrated and scalable process for $CO_2$ solute enhanced lipid isolation from aqueous microorganisms that has been demonstrated at the laboratory scale.

The process utilizes high-pressure $CO_2$ to release the oils from the cells and promote the efficient separation of wet algal biomass into oils, water, and biomass. The economic projections for algal biofuel cost reduction due to this technology are substantial.

The following examples are intended to illustrate but not limit the invention.

Example 1

Separating Lipid from Algal Biomass Using $CO_2$ as a Solute

This example illustrates the use of $CO_2$ as a solute to overcome kinetic and thermodynamic barriers to separate lipid from wet algal biomass.

Cost and technological barriers are due to kinetic (viscosity and density) and thermodynamic (solubility) problems that associated with separating the algal oils from biomass and water. Provided herein is readily available and recyclable $CO_2$ SOLUTE as a novel approach to overcome these technological hurdles. Our approach is different from conventional supercritical extraction which uses $CO_2$ as a solvent and includes a much greater demand for $CO_2$ and consequently leads to a more expensive purification process as will be described.

The rate of processing of biomass (Q liters/time) by centrifugation is shown in equation (1):

$$Q = \left\{\frac{2r^2(\rho - \rho_0)}{9\mu}\right\}\left[\frac{\pi L(R_0^2 - R_1^2)\omega^2}{\ln\left(\frac{R_0}{R_1}\right)}\right] \quad (1)$$

As shown, the processing rate is inversely proportional to the viscosity ($\mu$) of the fluid and directly proportional to the density difference between the two components being separated ($\rho - \rho_o$) These are the kinetic (viscosity and density) barriers to the separation of the lipid from the biomass and water phases. Other parameters are centrifugal inner and outer radii, $R_o$ and $R_1$, centrifuge speed, $\omega$, length of centrifuge, L, and particle radius, r. The difficulty is in separating oil from the biomass. If the viscosity is high and the density difference is small as commonly true in lysed algal mixtures, one must increase the centrifuge speed ($\omega$) and size (centrifuge radius $R_o$-$R_1$) in order to achieve sufficient separation. These high speeds and large sizes are the reasons that centrifuges represent the most expensive capital (and power) costs for any algal production system. Alternatively, if such barriers (viscosity, density) can be overcome, the capital and operating cost of the centrifugal separation can be lowered by reducing the speed ($\omega$) and size ($R_o$-$R_1$) of the centrifuge.

Another technological and cost barrier is the use of lipid extraction step with environmentally unfriendly solvents such as hexane or large volume processes with supercritical $CO_2$. Lipid extraction is used to isolate the oil selectively from water and biomass phases. If rapid phase separation between the oil, water, and biomass phases can be achieved by decreasing the solubility (thermodynamics) of each in the other phase, it may be possible to eliminate environmentally unsound extraction steps using hexane or other solvents. The method disclosed herein reduces the solubility of oil in biomass and water through the introduction of a $CO_2$ solute. Therefore, a process is disclosed that employs $CO_2$ as a solute to: (1) reduce viscosity ($\mu$); (2) increase density differences ($\rho - \rho_o$) between phases; and (3) shift the thermodynamic solubility of an independent oil phase in order to reduce processing costs. The results demonstrate the effects of CO2 solute on the physical properties of the oil and oil-water-biomass mixtures and include a laboratory process that applies these differences in physical properties to arrive at an integrated algal lipid purification process. This process includes a series of unit operation steps for purifying algal oils from water and biomass.

While the use of $CO_2$ as a solvent is not viable economically, using $CO_2$ as a solute represents an alternative approach that takes advantage of the non-polar, lipid-friendly properties and ready availability of $CO_2$ to alter the kinetic and thermodynamic barriers to lipid separation from biomass and water. When $CO_2$ is used as a supercritical solvent, the volume fraction of $CO_2$ represents 99% of the total volume of processing material. In contrast, when using $CO_2$ as a solute, the fraction of $CO_2$ may represent between about 10 and 50% of the total volume of material, a minor increase of less than about 50% of the total processing volume. This minor increase compares favorably to a 200-fold increase in processing volume for supercritical $CO_2$ solvent.

Using $CO_2$ as a solute improves lipid removal from algae despite the fact that very large amounts of $CO_2$ solvent are necessary for extraction of oils. The key point is that $CO_2$ is not used as a separate (solvent) phase to extract the oil but rather as a solute that dissolves in oil to alter the kinetic (viscosity and density) and thermodynamic (phase behavior) properties of the lipid phase and facilitate its isolation from biomass and water. In centrifugation the more dense components migrate away from the axis of the centrifuge while the less dense component will move towards the axis. Because of the high barriers (high viscosity and similar density), centrifuges used to separate oil, water and biomass must be large and expensive. The viscosity of a lipid-water-biomass mixture is large because of the naturally high viscosity of nucleic acids, carbohydrates, and proteins in the biomass. Indeed, the processing capacity Q is inversely proportional to the viscosity and thus will be very low because of the highly viscous nature of concentrated lipid-water-biomass mixtures. Similarly, the density differences ($\rho - \rho_o$) between lipid, water, and biomass are not large.

With a high viscosity and low density difference, the kinetic driving force is small and this represents a major barrier to economical separation of algal biofuels. We have demonstrated that $CO_2$ as a solute alters each of the individual kinetic and thermodynamic barriers to isolating oil from microorganisms in aqueous media thereby advancing the state of the art for lipid isolation from water and biomass.

The processing throughput, Q, of the centrifuge as shown in equation (1) is inversely proportional to the viscosity. As $CO_2$ is incorporated, the viscosity decays exponentially as shown in FIG. 1 for a polymer/solvent mixture as a function of $CO_2$ added. By incorporating $CO_2$ in an oil phase, we may reduce the viscosity of the oil phase and increase processing efficiency. Thus, if we reduce the viscosity by an order of magnitude, this will increase the throughput Q by a factor of 10 without having to alter any other conditions in the centrifuge. Equivalently, with 10-fold reduction in viscosity, we could achieve an equivalent throughput Q using a centrifuge at much lower size ($R_0$-$R_1$ in equation 1) with a significant reduction in capital and operating costs for algae bioprocessing. FIG. 1 shows data collected in our laboratories for the viscosity of a polymer/solvent mixture as a function of the amount of $CO_2$ added. The data and that of several dozens of other systems studied, shows that the viscosity is an exponentially decaying function of the volume fraction of $CO_2$ i.e., the log of viscosity varies linearly with the volume fraction of $CO_2$.

To illustrate the potential effect of adding $CO_2$, assume that a batch of preprocessed algae contains equal amounts of lipid, biomass, and water. Then, imagine that we subject the mixture to $CO_2$ at elevated (but subcritical pressures) such that the mixture dissolves 30% $CO_2$ by mass. Since CO2 will favor more neutral components, a reasonable estimate is that 50% of the $CO_2$ will go into the lipid, 30% into the biomass, and 20% into the water. Given the semi-logarithmic effect of $CO_2$ on viscosity, both the lipid-$CO_2$ viscosity and the biomass-$CO_2$ will decrease significantly because $CO_2$ has a larger effect on the more viscous materials. The lipid-$CO_2$ viscosity would decrease by about 2.5 orders of magnitude from about 1000 cp to about 5 cp. The biomass viscosity will decrease about 2.1 orders of magnitude from 10,000 cp to about 90 cp even with limited amount of $CO_2$ dissolved in the biomass.

Figure 2:
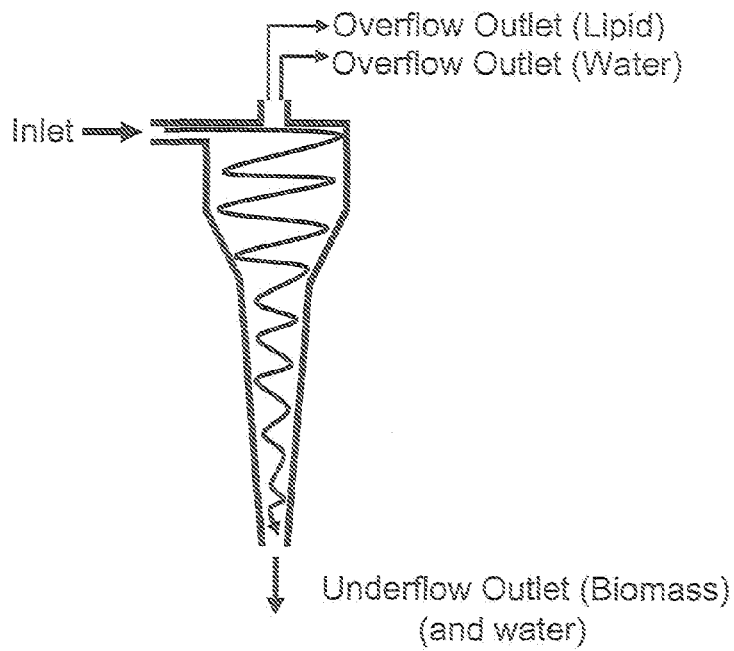
FIG. 2 is a pictorial representation of a cyclone or hydrocyclone for the separation of oil from biomass and water without moving parts.

This huge decrease in viscosity for biomass and lipid is due to a significant volume expansion (large partial molar volume) that opens spaces in the lipid and biomass due to the presence of dissolved $CO_2$. The availability of these spaces in the biomass and lipid allow molecules to flow more easily. The major barrier to separation in the centrifuge is the ability of lipid to migrate through the biomass, and this is dictated by the high viscosity of the biomass. A 110-fold decrease in the viscosity of the biomass will result in a 110-fold increase the processing throughput. Alternatively, one could keep the processing capacity the same and instead lower the centrifuge speed by 8.6 fold. Such a reduction in speed will lower the power requirements and may allow the substitution of the expensive centrifuge with a cyclone with no moving parts (FIG. 2). Alternatively, a similar decrease in the radius of the centrifuge is also possible to reduce the size of the equipment.

The processing throughput Q, also is directly proportional to another kinetic barrier, the density difference ($\rho$-$\rho_o$) between components to be separated. The lack of a significant density difference between the three components in the mixture lowers the processing throughput, Q, and necessitates higher speeds or larger centrifuge radii to accommodate of the small density difference. In order to see the possible effect of $CO_2$, we may assume that the densities of the biomass, water, lipid, and $CO_2$ are about 1.2, 1.0, 0.9 and 0.7 g/ml, respectively. The incorporation of less dense carbon dioxide into the lipid phase will lower the lipid phase density and enhance the difference between lipid and water or biomass. As a result, a second kinetic barrier to lipid separation, the density difference, will also be lowered.

Molar volumes vary approximately linearly with $CO_2$ concentrations. Using the same conditions as described previous, the lipid density will decrease to about 0.8 g/ml, the biomass will decrease to about 1.05 g/ml, and the water would change to 0.9 g/ml. Again, the most difficult separation will be the lipid from the biomass and in his case the density difference ($\rho$-$\rho_o$) will increase slightly from 0.3 g/ml to about 0.35 g/ml. As a result, a second kinetic barrier to lipid separation, the density difference, will be lowered, though only slightly.

Figure 3:
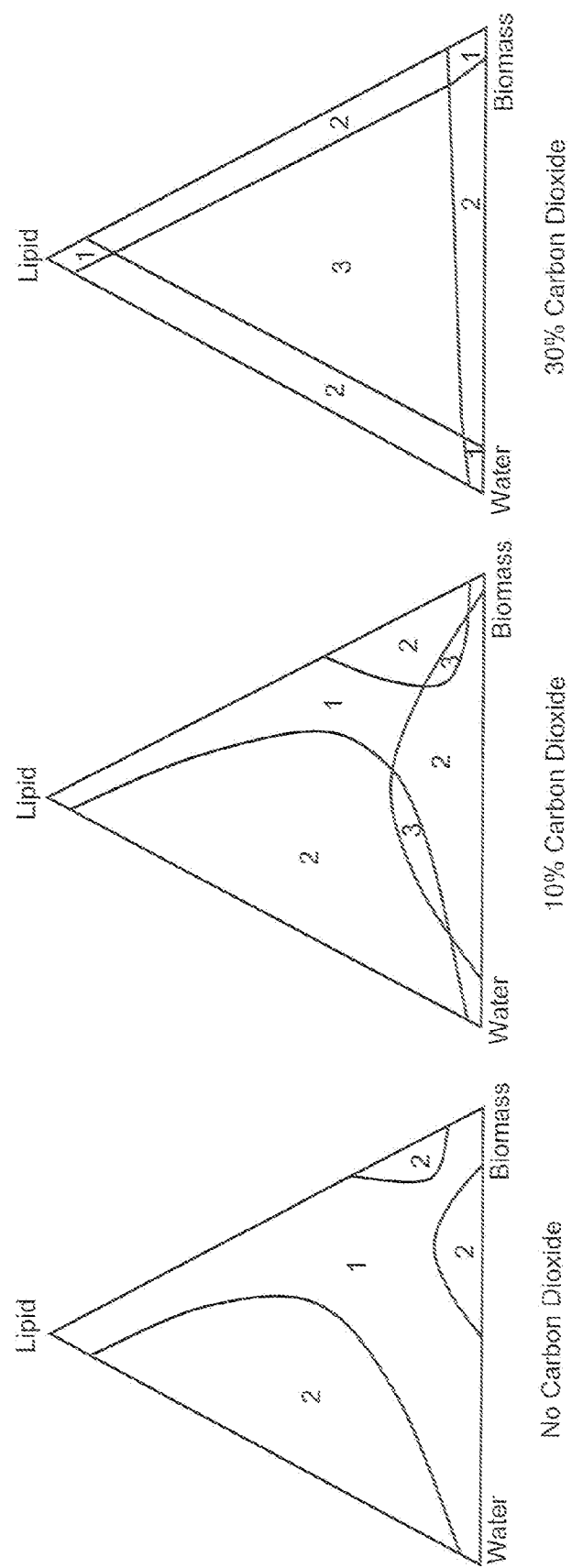
FIG. 3 is a triangular phase diagram with plates A (left), B (center), and C (right) that illustrates a pseudo three component system containing water, lipid, and biomass.

Referring to FIG. 3, which represents a three phase system including water, oil (lipid), and biomass, there are three two-phase regions illustrating the immiscibility of water and lipid and the partial immiscibility of water and biomass as well as lipid and biomass. Plate B shows how the addition of 10% $CO_2$ causes the two phase regions to grow and the creation of two three phase regions where the two phase regions overlap. Plate C shows how the addition of 30% $CO_2$ causes the further growth in the two phase regions so that now they overlap significantly and form a large three phase region in the center of the phase diagram.

The key engineering challenge in the production of biofuels from algae is the separation of lipid from the other biomass and water. As a non-polar solvent, the introduction of $CO_2$ primarily into a lipid phase will make the thermodynamic properties of the lipid components more non-polar. This will lower the compatibility of oil with water and biomass and facilitate a greater phase separation between the three components. A greater phase separation should in turn enhance the amount of oil that can be separated from water and biomass at equilibrium.

The second most difficult challenge is to remove water from the biomass. The optimal way to overcome these challenges is to operate in thermodynamic phase space where there are at least three distinct phases where each of the species (lipid, water, biomass) is relatively pure. Furthermore, if the phase separation extracts primarily neutral lipids into the lipid phase, then we will have a product, which is more easily converted to biodiesel.

At higher concentrations of $CO_2$ it may be possible to obtain three or more phases, which can be especially advantageous to the separation of lipid from biomass and water from biomass. These multi-phase regions are likely to occur within a region in the middle of the triangular diagram containing approximately equal amounts of the lipid, water, and biomass. A three-phase mixture will be detected by the observation of two-phase boundaries in the view cell following the setting time. Preliminary results, with a *Tetraselmis ehuii* algae culture, are demonstrative of this, in which the formation of three liquid phases (in addition to one gas phase at the top) including a middle lipid phase was observed. Once again, the control sample exhibited legible settling due to the presence of either kinetic (high viscosity and low density difference) or thermodynamic barriers. These multi-phase regions if they contain primarily oil, lipid, and water may be particularly advantageous to separation of all three components in a centrifuge or cyclone. Furthermore, the three-phase region is likely to expand with increasing $CO_2$ concentrations allowing a range of different operating conditions possible. Separation can also be achieved by successive two-phase behaviors as long as the lipid is isolated with significant purity. At each point, it is initially determined if a two phase or three-phase region is obtained (thermodynamic barriers). The kinetic barriers are also determined by measuring the time for settling into two or three phases as well as the viscosity of the densest phase. Viscosity is determined by adding a stir bar in the densest phase and measuring its resistance to rotation as compared against a water standard.

A series of separation experiments are performed in a batch cell and then moved to a continuous process once conditions are optimized. From an examination of the phase diagram, conditions in which multiple phases are generated in the presence of $CO_2$ are identified. These multi-phase regions will be the potential operating conditions in which to undertake the lipid isolation from algae biomass. Once the number of possible operating conditions have been limited based on thermodynamics and kinetics (from year one), the operating space around these general conditions to optimize performance are explored. The first step is to choose a potential operating, condition and then examine the separation efficiency at this point as well as optimize different parameters. The first criterion that the operating condition must meet is that it is within the potential operating parameters in terms of reasonable levels of lipid content, biomass, and water. If possible, a high enough lipid content is chosen, which can be obtained experimentally. In addition, these regions must be selected so that at least two and ideally three phases are present when the appropriate amount of $CO_2$ is added. As a result, the most likely operating conditions to be chosen will be near the middle of the triangular phase diagram with intermediate lipid and water content and at a $CO_2$ concentration, which is sufficient for two- or three-phases to form. Since maximal removal of pure lipid is desired, then the conditions, which provide for the highest quality and quantity of lipid will also be considered. Therefore, the next step is to examine the amount and quality of each of the phases at the potential operating conditions.

Once a number of different four component concentrations (by varying the ratio of water to lipid to biomass in increasing $CO_2$ concentrations) have been examined, a comprehensive collection of phase diagrams between lipid, water, and biomass in the presence of increasing amounts of $CO_2$ as a solute are constructed. These phase diagrams are extremely valuable in determining the regions of multiple phase behavior in the presence of $CO_2$. These multiple phase regions are the conditions for operating the lipid and biomass isolation process. These conditions likely indicate not only desirable levels of $CO_2$ but also maximum levels of water acceptable and a minimum allowable lipid concentration in order to achieve a rapid phase separation in the presence of specified amounts of $CO_2$.

FIG. 3 shows how the addition of $CO_2$ may change the regions of immiscibility in a three component system. When $CO_2$ is introduced as a solute into the liquid phase at approximately 10 to 30% at temperatures and pressures below the $CO_2$ critical point, the phase behavior changes dramatically. The first plate shows that water and lipid are highly immiscible (in fact they actually are more immiscible than shown) while water and biomass as well as biomass and lipid have only small regions of immiscibility. As $CO_2$ is added (as shown in Plates B and C), the regions of immiscibility increase, overlap, and create a three-phase region. In these diagrams, temperature (T) and pressure (P) have been fixed so the solubility of the different components can be shown more clearly. In these triangular diagrams, each apex represents a pure component and each edge represents the binary behavior. The interior of the triangle represents the three-component behavior of the system. As shown, there is a large two-phase region for the lipid-water mixtures and smaller two-phase regions for the water-biomass and lipid-biomass systems. However, given the characteristics of algae and their ability to generate significant amounts of lipid, there may be only one phase along that lipid-biomass edge. Importantly, these phases will have significantly different physical properties in terms of lipid mass fraction, viscosity, and density after $CO_2$ is added and these differences in physical properties will reduce the thermodynamic and kinetic barriers for separation. Plates B and C show the effect of adding $CO_2$ to the system. As shown, the two-phase regions will increase in size and merge together to create a three-phase region. Four phase regions also are possible.

Experimental measurement of ternary phase diagrams for different algal systems is essential for the design of an optimal lipid separation process using $CO_2$ solute approach. The extent and compositions in the three-phase region for different amounts of $CO_2$ must be determined and physical properties in terms of density difference and viscosity must be characterized in order to be able to select an operating region for centrifugal separations of the lipid and water phases. One approach is to vary P and T and $CO_2$ concentration to map out the phase diagrams by altering all three variables. Alternatively, P and T may be fixed and phase diagrams for varying amounts of $CO_2$ may be generated. T is fixed at about room temperature in this process such that energy related costs may be limited and the P will be limited to values below the critical pressure. Higher pressures may not be needed as there is considerable data, which demonstrates the effects shown in FIG. 2 at sub-critical pressures. Triangular phase diagrams are generated at different $CO_2$ concentrations in order to assist with separating the lipid, water, and protein (or biomass) into three separate and distinct phases, which will also include dissolved $CO_2$.

$CO_2$ is incorporated as a solute into oil phases and this incorporation changes the physical properties of the overall system. These differences are applied to a series of laboratory unit operations for lipid isolation using $CO_2$ solute that can be scaled up to commercial as a less costly and more environmentally friendly method for lipid isolation from microalgae.

Example 2

Single-Step Harvesting & Extraction of Oil from Wet Microalgal Biomass

One further extension of this technology is to combine both the harvesting of algal biomass and extraction of lipids into a single process.

Currently, high capital and operating costs are associated with the collection of relatively dilute concentrations of microalgal cells from growth media (2-10 g/L). The time, energy, and incurred expenses associated with harvesting and drying this biomass for use in conventional oil extraction procedures could be greatly reduced if the cells could be lysed in situ and oil subsequently purified from the mixture.

Harvesting and lysis is accomplished by first attaching small $CO_2$ bubbles to the algal cells to bestow a massive density difference from the surrounding liquid allowing low cost low speed centrifugation separation (as compared to expensive higher speed centrifugation used currently). Second, lysis will be accomplished with $CO_2$ bubble rupture of the algal organism.

The basis of this process relies on the fact that after pressurization of algal biomass with $CO_2$, the dissolved gas will preferentially associate with the lipids within the algal cells. Thus, subsequent rapid decompression will lead to immediate expansion of $CO_2$ bubbles in these cells and likely result in efficient lysis of the cells and release of oil bodies from the intracellular space. This process alone may provide sufficient driving force to then separate the mixture into three phases (oil, water, residual biomass) as described above. Alternatively, an additional pressurization and release may be necessary to assist complete phase separation. The advantages of this process are clear. The single-step procedure could make other harvesting techniques (flocculation, filtering, centrifugation, etc.) and pre-treatment (lysis, drying, etc.) obsolete.

Single-step harvesting and extraction would enable algal cultures to be harvested quickly and efficiently with minimal additional equipment costs. Additionally, since $CO_2$ is already an integral part of the algal biomass production process ($CO_2$ bubbled in media continuously during cultivation), there is an existing infrastructure build for pumping this gas throughout cultivation facilities. In fact, the possibility for a cultivation vessel, with inlets for $CO_2$, to also function as a harvesting and extraction chamber is not unrealistic and could be feasible with this new approach to downstream processing. Furthermore, continued algal strain development, genetic, and metabolic engineering approaches to facilitating oil recovery are likely to include secretion of hydrocarbons from algal cells. Here, conventional methods of cultivation (raceway ponds and photobioreactors) will contain a mixture of algal biomass, liquid media (predominantly water), and free fatty acids. For dilute solutions of oil in water, the high separation pressure $CO_2$ process is an ideal counterpart.

Another potential application of micro algae capable of secretion is immobilized cultivation on membrane surfaces or other systems of cell adhesion, such that the algal biomass may remain viable while secreting lipids into the surrounding medium, with no need to harvest the biomass itself, but only the oils. Similarly, the pressurized $CO_2$ process is a well-suited mechanism to recover this hydrocarbon feedstock for biofuel production.

Example 3

A Transformative Approach to Downstream Processing of Biofuel Feedstocks

While commercial use of microalgal biomass as a feedstock for biofuel production requires some of the most creative and novel engineering approaches to cell harvesting and oil extraction, the proposed technology has wide-ranging applicability to the separation of dilute hydrocarbon mixtures in aqueous solutions in general, particularly for recovery of biofuel metabolites. Similar to the production of algal biofuels, microbial sources of hydrocarbons for biofuel are becoming increasingly attractive. Developing microorganisms engineered to convert waste products, such as cellulosic biomass and other carbon-based substrates, into useful hydrocarbons has been pursued by a number of researchers. These production processes will also generate three-component mixtures of microbial biomass, oil, and water that must be separated. While microalgae represent a specialized area of interest and expertise for our group, this extraction technology will bridge the gap between microbial oil production and commercially viable oil recovery for a broad range of organisms, including bacteria and fungus.

There also exists the potential for in vitro enzymatic degradation of plant and animal by-products to yield mixtures of similar biofuel components for separation. In fact, for any biofuel production process that necessitates recovery of oils from biomass in dilute aqueous mixtures, the high-pressure $CO_2$ process may be applicable. However, due to the kinetic and thermodynamic barriers associated with the extraction of oil from microalgae, this process has some of the greatest hurdles to overcome and will prove to set the standard for novel oil recovery mechanisms for biofuel production.

Example 4

Algal Growth Experiments and Evaluation of Lipid Content

The algae are grown in order to reach the target lipid content, and then water is removed to reach the target level. In addition, different algae species are investigated to examine the robustness of the process. The different algae may contain different amounts of lipid and thus have different operating conditions, which are determined. Next, the biomass is lysed in the desired water content, added to the pressure cell and $CO_2$ is added to the optimal amount as specified in these experiments. It is then determined whether lipid can isolated efficiently from actual algae samples using $CO_2$ solute. The lipid and water phases are decanted and the amount of lipid in each phase determined in order to evaluate if a sufficient yield of lipid is obtained. The initial parameter is to obtain 70% or more of the neutral lipid in the lipid-rich phase. The profile of the lipid composition is examined. Also examined is the proportion of charged and neutral lipids in each phase in order to determine if the neutral lipids are preferentially moved into the lipid phase in the presence of carbon dioxide. The amount of lipid isolated is measured (thermodynamic barriers) as well as the time for the lipid phase to separate from the other phases (kinetic barriers). The viscosity of the mixture before and after settling is measured. In all cases, the amount separated (thermodynamics), quality of liquid, and physical properties (settling rate, viscosity, kinetic barriers) is compared to that in the absence of $CO_2$ to determine if $CO_2$ solute is indeed an effective and efficient solute for overcoming the thermodynamic and kinetic barriers towards isolation of lipids from algal biomass. As a second control, the efficiency of lipid obtained using $CO_2$ solute, as well as the total energy and material costs to the current state-of the-art processes such as hexane extraction or $CO_2$ supercritical solvent, are compared.

The initial algal species is chosen based on known production capability in either outdoor pond systems or hybrid open-closed bioreactors. *Nannochloropsis* species. OZ-1 was one of algal strains brought from the National Center for Mariculture (NCM), Eilat, Israel to the Center of Marine Biotechnology, UMBI by Oded Zmora in 2001. Synaptic Research has a MTA with COMB for the provision of this *Nannoehloropsis* species OZ-1. Recently, the OZ-1 culture was clonally purified at COMB, and characterized by sequencing its 18S rRNA gene. OZ-1 shared 100% sequence identity with multiple strains of *Nannochloropsis oceanica* based on the 18S rRNA gene sequence. OZ-1 has been successfully grown in indoor and outdoor systems. It is a fast growing algae and able to reach high cell density (>1.8 g/liter). In an industrial-size flat plate glass reactor, OZ-1 can grow at an optimal cell density ca. 6×108 cells ml, with continuous biomass productivity of 12 g dry cell mass $m^{-1}$ $d^{-1}$ through out the year. The amount and composition of lipid in OZ-1 have been measured at COMB (Place, unpublished data). The lipid content of OZ-1 is approximately 30% (dry weight) under the normal growth conditions, but can reach approximately 60% (dry weight) under nitrogen-limited growth conditions. This is in congruence with the amount of total fatty acids found in other marine *Nannochloropsis*. We also found that strain OZ-1 is very resistant to many chemical treatments like chlorine and viral infection.

For the phase diagram work lipid is extracted using supercritical $CO_2$ and the biomass recovered. This avoids introduction of organic solvents that may interfere with phase separation. The second target species was *Chlorella sarokiniana* UTEX 1230 and a proprietary *Chlorella vulgaris* organism designated *Chlorella* SR. *Chlorella* are a well established industrial production organism including for biofuels and *Chlorella* UTEX 1230 and *Chlorella* SR are especially desirable for biofuels production.

Algal biomass is grown in order to provide sufficient quantities of biomass for studies of physical properties and process development as well as to produce algae with a sufficient oil content for extraction. The volumes of the bioreactors are 8-36 L and volumes of the hanging bags are 8-100 L. After 5 days, the algae have grown to a much higher cell density as shown by the darker content in the bags and bioreactors.

In order to characterize the algal growth kinetics, cell mass data was collected for the growth of *Chlorella sorokiniana* algae in phototrophic mode over a period of 18 days. Following a brief lag phase, the cells exhibit typical exponential growth behavior until 12 days at which time cell growth slowed significantly. The final dry biomass concentration was measured to be 0.86 g/L culture. The target for producing algae in is 2 grams per liter, which will require approximately one more doubling time. In order to achieve that doubling, this strain of *Chlorella* can be grown in either heterotrophic (liquid carbon source only) or mixotrophic conditions including both glucose as a carbon source and light for phototrophic expansion. Using a liquid carbon source with or without sunlight enables modest growth improvement required for generating 2 g/L cell mass. The target processing 100 grams of algae will require 50 liters of algal biomass. This amount of biomass can readily be generated in either bioreactors or large bag reactors.

The lipid content of *Chlorella sorokiniana* under phototrophic and heterotrophic conditions was examined. Under phototrophic conditions, the *Chlorella* line used reached a lipid content of 28% together with a protein content of 13% and carbohydrate level of 6.2%. While this lipid content is satisfactory, an increase the lipid content up to approximately 50% in order to fully utilize the $CO_2$ solute separation methodology was desired. Fortunately, by switching to heterotrophic growth with glucose as a carbon source, it was possible to increase the total lipid content in *Chlorella sorokiniana* to 56% along with 6.2% protein and 12% carbohydrate. Thus, by using a liquid carbon source, the growth conditions that provide sufficient biomass and lipid content to meet demands was established.

Example 5

$CO_2$ Solute Dissolution in Oil and Oil-Water-Biomass Mixtures

The actual lipid purification process must consider three components: lipid, water, and biomass together and thus it is important to map the phase behavior of the four component (including $CO_2$) phase diagrams. These represent the inner regions of the triangular diagrams with a separate triangular phase diagram obtained at increasing $CO_2$ concentration as shown in FIG. 3. This analysis was demonstrated both by mixing in fixed amounts of lipid and biomass plus water and by using natural algal mixtures containing different levels of lipid content. Especially significant is the phase separation of lipid from biomass, which is critical to isolating the lipid phase from the biomass. Phase diagrams are generated by varying the concentration of lipid and biomass for a given $CO_2$ concentration. For example, at 0% $CO_2$, mixtures are created at 25%, 50%, and 75% lipid to biomass (and more as time permits) and it is determined whether any phase separation occurs. Algal strains that contain different levels of lipid content naturally are also utilized. Next, increasing amounts of water is added to the mixture in order to define the inner region of the triangular phase diagram. The advantage of using $CO_2$ is that the same lipid-biomass-water formulations can be used with increasing $CO_2$ concentrations. The $CO_2$ is added and then the pressure cell is allowed to come to equilibrium at which point the phase cell is examined for the formation of multiple phases. If no phase change occurs, then the concentration of $CO_2$ is increased at a constant pressure (P) and temperature (T) until a phase change is detected. The formation of two phases is indicated by the onset of a cloud point followed by settling into two or more phases. Phase planes are generated up until about 40% $CO_2$ or at least until a two phase separation occurs. Once a phase change occurs (thermodynamic barrier overcome), then the effect of a phase change on the kinetic barriers by measuring the time for settling and the viscosity of the mixture is examined. If the mixtures settle rapidly into different phases, then the kinetic barriers are reduced because settling accounts for both density and viscosity effects according to Stokes' equation for settling. Thus, from the rate of settling and the viscosity, it is possible to measure the extent to which the kinetic barriers have been altered by adding the $CO_2$ solute. Preliminary results in which an algae culture (*Tetraselmis chuii*) with approximately 20% lipid in an equal mixture of water and algae was examined for phase separation in the presence or absence of $CO_2$. The flask with $CO_2$ had a distinctive lipid layer at the top of the pressure cell. The control sample appeared to lack any distinct lipid region and instead contains an emulsion likely due to thermodynamic and kinetic barriers to separation. These results are suggestive that the presence of $CO_2$ as solute can induce the formation of a distinct lipid region and alter the thermodynamic and kinetic driving forces for separation.

In order for $CO_2$ to alter the physical properties, the $CO_2$ must dissolve into the oil phase. Therefore, it was necessary to determine under what conditions $CO_2$ would dissolve in oil and in oil-water, oil-water-protein, and algal biomass-water mixtures and determine the thermodynamic properties including cloud point and bubble point. The cloud point is the pressure at which the first drop of liquid $CO_2$ emerges as oil and $CO_2$ separate into different phases. The bubble point is the pressure at which $CO_2$ bubbles as a gas from the oil. Dissolution of $CO_2$ in oil requires elevated pressures as $CO_2$ will remain as a gas at atmospheric pressure. Therefore, the necessary pressures required to enable $CO_2$ dissolution as a single phase in oil were determined. These experiments were performed in a pressure cell, which mimics the pressure behavior of processing equipment.

Figure 4:
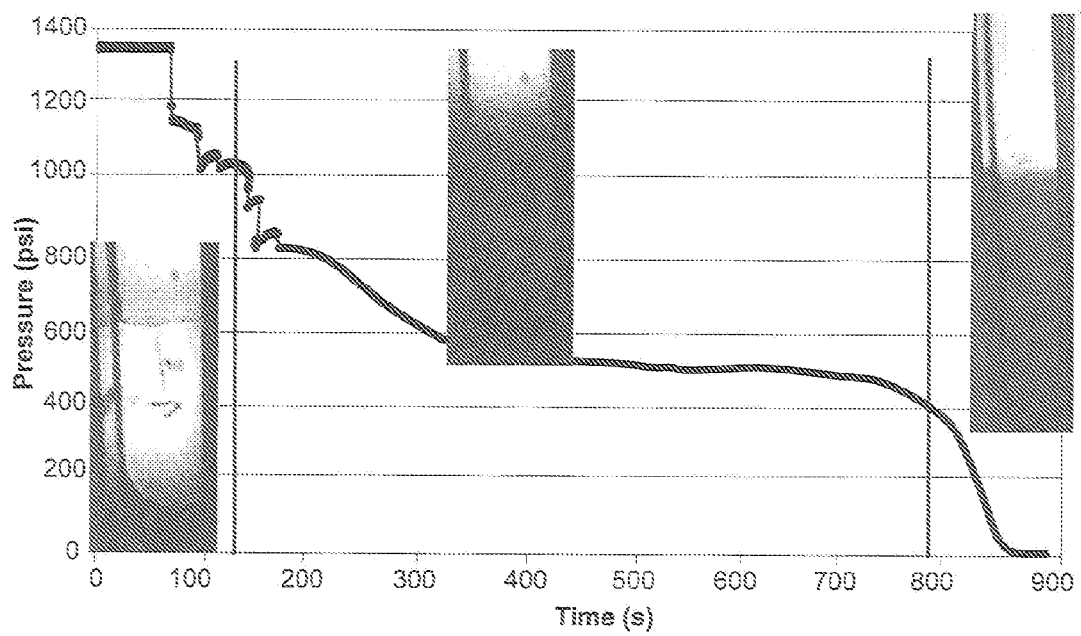
FIG. 4 is a graphical representation of pressure versus time for $CO_2$ dissolution in oil at different pressures. Left hand picture is the oil and $CO_2$ as a single phase. First line designates the cloud point pressure and middle picture is the cloud point with $CO_2$ and oil as two phases. Second line designates the bubble point and the right hand pictures shows bubble point of $CO_2$ as a gas phase.

Once it was determined if oil-$CO_2$ could form a single phase, the pressure was lowered until the first drop of liquid $CO_2$ separated from the oil into two distinct liquid phases. Shown in FIG. 4 is a plot of the pressure versus time for an experiment in which $CO_2$ is mixed with oil at a high pressure and then the pressure gradually lowered. As can be seen in the photograph on left from the pressure cell, the $CO_2$ has dissolved in oil at 1000 psia to form one clear continuous phase. Then as the pressure is lowered, a two phase liquid mixture of $CO_2$ and oil form as indicated by the cloudy picture in the middle. This was the cloud point (as designated by the vertical line) and is the minimal possible operating pressure for a single liquid phase. The pressure was then lowered more until gas bubbles of $CO_2$ emerge at the bubble point about 400 psia (designated by a second vertical line). This was the minimal pressure to maintain liquid $CO_2$ mixed with oil. Thus, this experiment shows that $CO_2$ will dissolve in oil.

Figure 5:
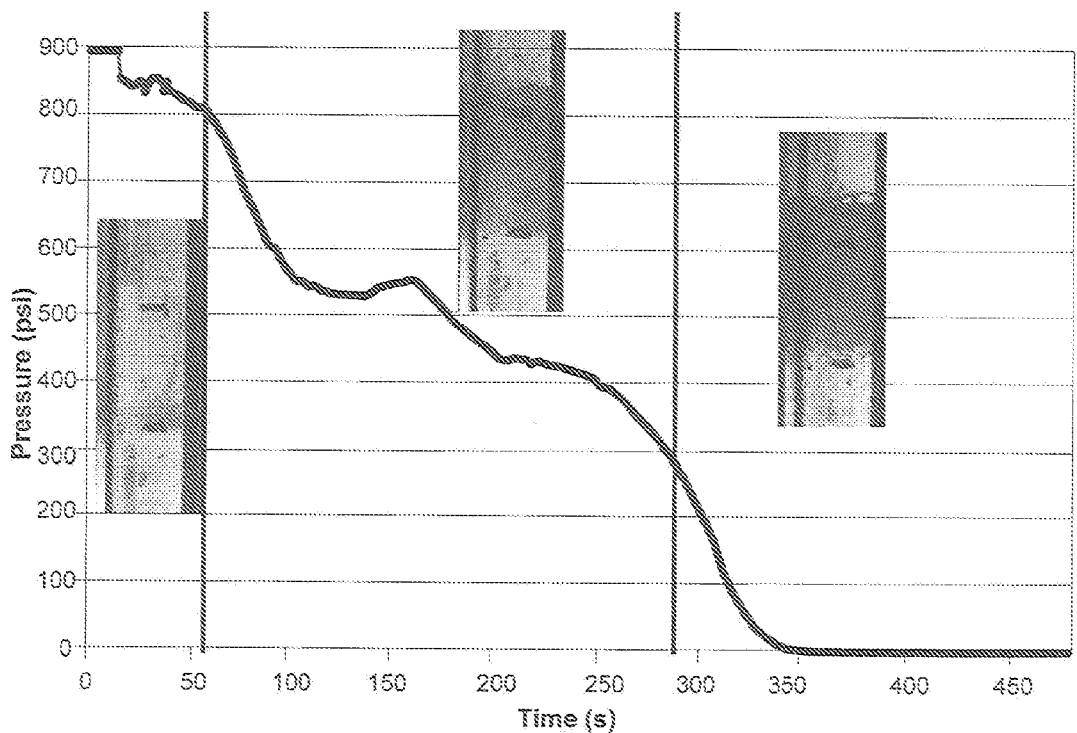
FIG. 5 is a graphical representation of pressure versus time for $CO_2$ dissolution in oil-water mixture at different pressures together with single phase (left), cloud point (middle), and bubble point (right) pictures.

Next, the thermodynamics of $CO_2$ dissolution in oil and water mixtures were examined as shown in FIG. 5. Water and oil were mixed at a ratio of 2.4 parts water to 1 part oil and then 2 parts liquid $CO_2$ was added at the top. At pressures above 800 psia, a single oil-$CO_2$ phase is indicated in the photograph on the left. A cloud phase occurred at lower pressures as shown with the photo in the middle and then a bubble point is evident at much lower pressures below 400 psia as indicated by the bubbling of $CO_2$ gas from the oil layer.

These plots show that $CO_2$ can dissolve as a single phase solute into oil even in the presence of a greater quantity of water.

Figure 6:
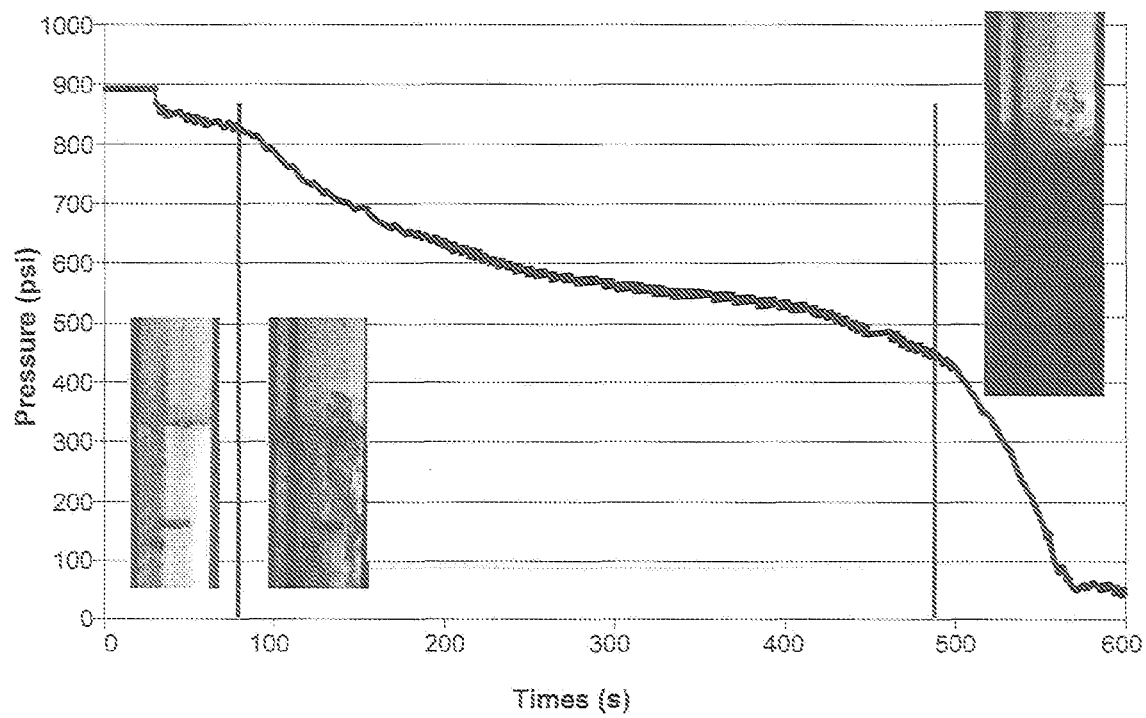
FIG. 6 is a graph, which shows pressure versus time for $CO_2$ dissolution in oil-water-protein mixture at different pressures together with single phase (left), cloud point (middle), and bubble point (right) pictures.

The next experiment examined the effect of adding protein to an oil-water mixture in the same proportions. Similar results were obtained as those with the oil-water mixture as shown in FIG. 6 in that a single continuous $CO_2$-oil phase was evident at pressures above 800 psia. Once again, a two phase mixture (possible entrapping some protein) emerged at lower pressures and then a bubble point formed at approximately 425 psia. Thus, the presence of protein does not negatively impact the ability of $CO_2$ solute to dissolve as a continuous phase in oil.

Figure 7:
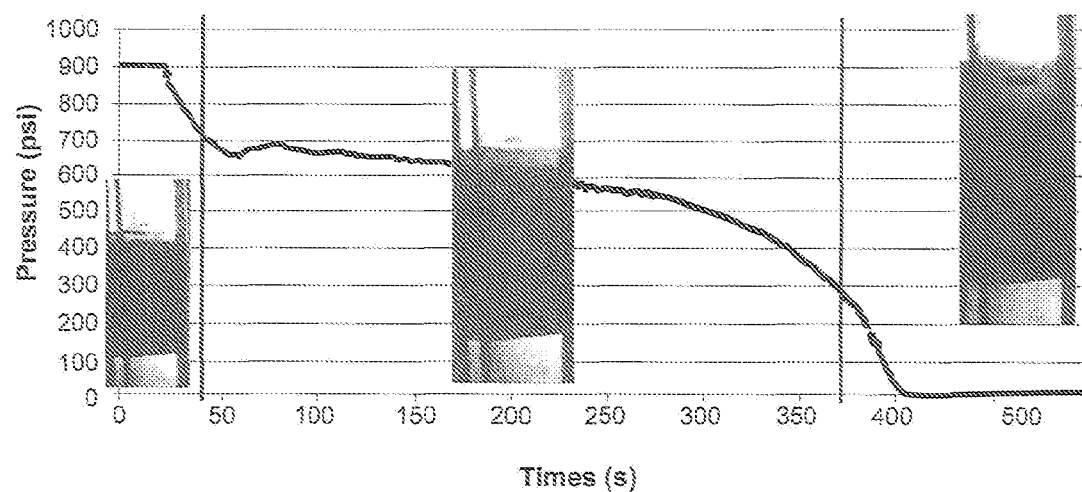
FIG. 7 is a graphical representation pressure versus time for $CO_2$ dissolution in oil-water-biomass mixture at different pressures together with single phase (left), cloud point (middle), and bubble point (right) pictures.

A final $CO_2$ solubility experiment was performed with algal biomass mixed with the water and oil in the ratio of 1 part biomass:13 parts oil:28 parts water followed by an equal volume of $CO_2$ (FIG. 7). Much of the biomass and oil mixed together as an intermediate phase. However, a distinct oil layer was also observed above the biomass-oil mixture, which was used to investigate the solubility. A single clear oil layer was observed at pressures above 800 psia. When the pressure was dropped below that level, cloudiness was detected in the upper oil phase to indicate two phases form. Interestingly, the pressure remained relatively constant for a number of seconds as the oil emerged from the oil-biomass phase. Finally, a bubble point region was detected in the range of 300 psia. Thus $CO_2$ can dissolve in oil even in the presence of biomass but the oil and the biomass also form a second intermediate phase above the water, which likely also retains significant $CO_2$. These results show that $CO_2$ can indeed dissolve as a solute in a predominant oil phase even in the presence of other components with pressure maintained at or above a level of approximately 800 psia. These experiments established the design goal for a minimum pressure to use for $CO_2$ solubilization in oil.

Example 6

Effect of $CO_2$ on the Oil and Water Expansion

Figure 8:
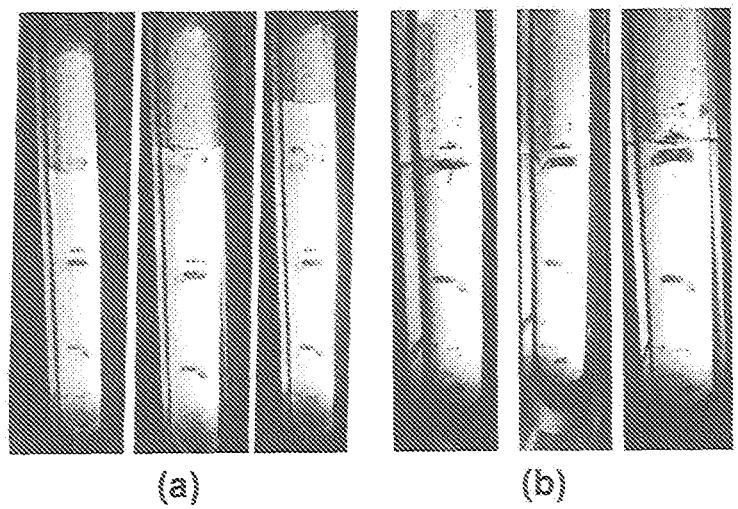
FIG. 8a is an image that depicts the change in liquid oil volume at 0, 1, and 24 hours following mixing of equal amounts of oil and $CO_2$.
FIG. 8b is an image that shows the change in water volume at 0, 5, and 24 hours following mixing of equal amounts of water and $CO_2$.

Once it was determined that $CO_2$ dissolves in oil, it was next determined if $CO_2$ changed the physical properties of oil. One of the properties that is desirable to change for separation purposes is the density of oil. The inverse of the density property is the volume occupied by a given amount of oil. Therefore, an experiment was performed to determine if the volume occupied by oil changes following the dissolution of $CO_2$. A mixture of approximately equal parts by weight liquid oil and $CO_2$ were mixed and the level of the $CO_2$ was measured. As can be seen in FIG. 8a, the liquid level increased over 3.3 cm after 24 hours following dissolution of the $CO_2$ in oil. Since the chamber is 1 inch (2.54 cm) by 1 inch (2.54 cm) wide, then the volume change was 22% at the applied pressure of 850 psia. Thus, the volume change of oil resulting from incorporation of $CO_2$ can be significant. In order to compare $CO_2$ dissolution in oil to water, a similar experiment was performed with a water phase with $CO_2$. In contrast to the effect of $CO_2$ in oil, the water increased only by 0.5 cm in height over the same time period for a modest 5% volume increase (FIG. 8b). Clearly $CO_2$, as a non-polar solute, is much more soluble in oil as compared to water. Most importantly, $CO_2$ is less dense and less viscous than both and thus the impact of $CO_2$ dissolution will be to increase the density difference between water and oil and lower the viscosity of all the components in the mixture.

Example 7

Effect of $CO_2$ on the Phase Separation of Oil from Biomass and Water

Figure 9:
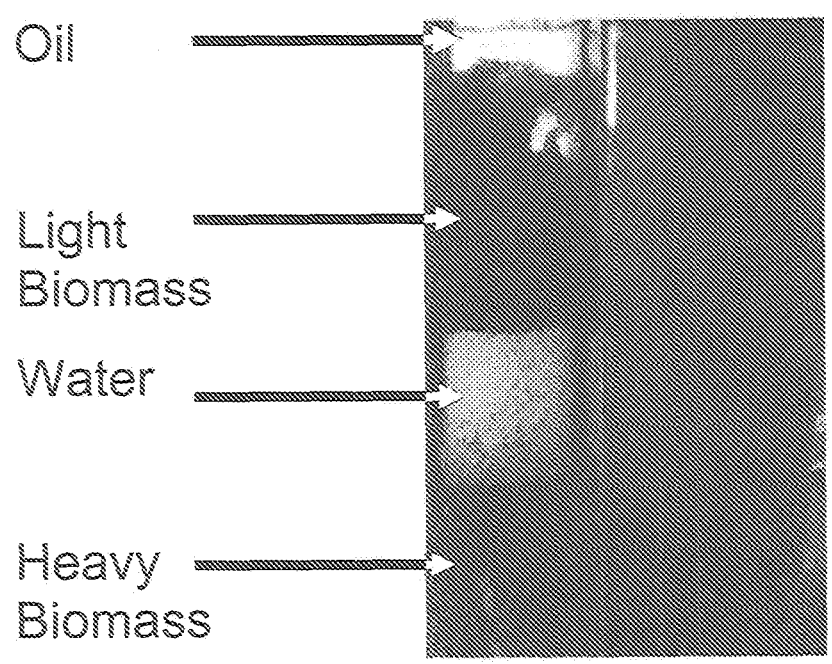
FIG. 9 is a photograph that demonstrates the effect of $CO_2$ on the separation of oil, light biomass, water, and dense biomass is shown in the pressure tube (left photo). In the control sample (right photo), the untreated samples remained principally as biomass and water phases. In the $CO_2$ solute treated sample, an increased amount of oil is available in the uppermost phase containing algal bi-products.

A final objective of the studies was to determine if the presence of $CO_2$ could alter separation of the oil from the biomass and water mixture. Since high pressure cyclones and centrifuges were not available, a sedimentation comparison was performed to see if any detectable differences in settling can be observed. Small differences observed in a settling experiment can be enhanced by amplifying these differences using centrifugal forces with a hydrocyclone. An experiment was performed in which algal biomass, oil, and water were combined in ratios of 2 parts water: 1 part oil: and 0.1 part algae biomass. Then one control sample was maintained at atmospheric pressure. A second sample was pressurized to above 800 psia in the presence of liquid $CO_2$ and the contents of the pressure cell were compared to the control after 44 hours. Shown in FIG. 9 is a comparison of the sample from the pressure chamber (left) with the control tube (right). After 44 hours of separation by settling alone in the presence of high pressure $CO_2$, a distinct oil layer was observed that was expanding into the light biomass layer while the biomass layer was shrinking. In addition, a separate water phase and dense biomass layer was also observed. In contrast, only two layers representing biomass mixed with oil and water were evident in the control photo on the right.

Example 8

Process Flow for Oil Isolation from Biomass and Water: Upstream Processing

The downstream lipid isolation steps that are the key barriers to large-scale lipid isolation are illustrated in this example.

Figure 10:
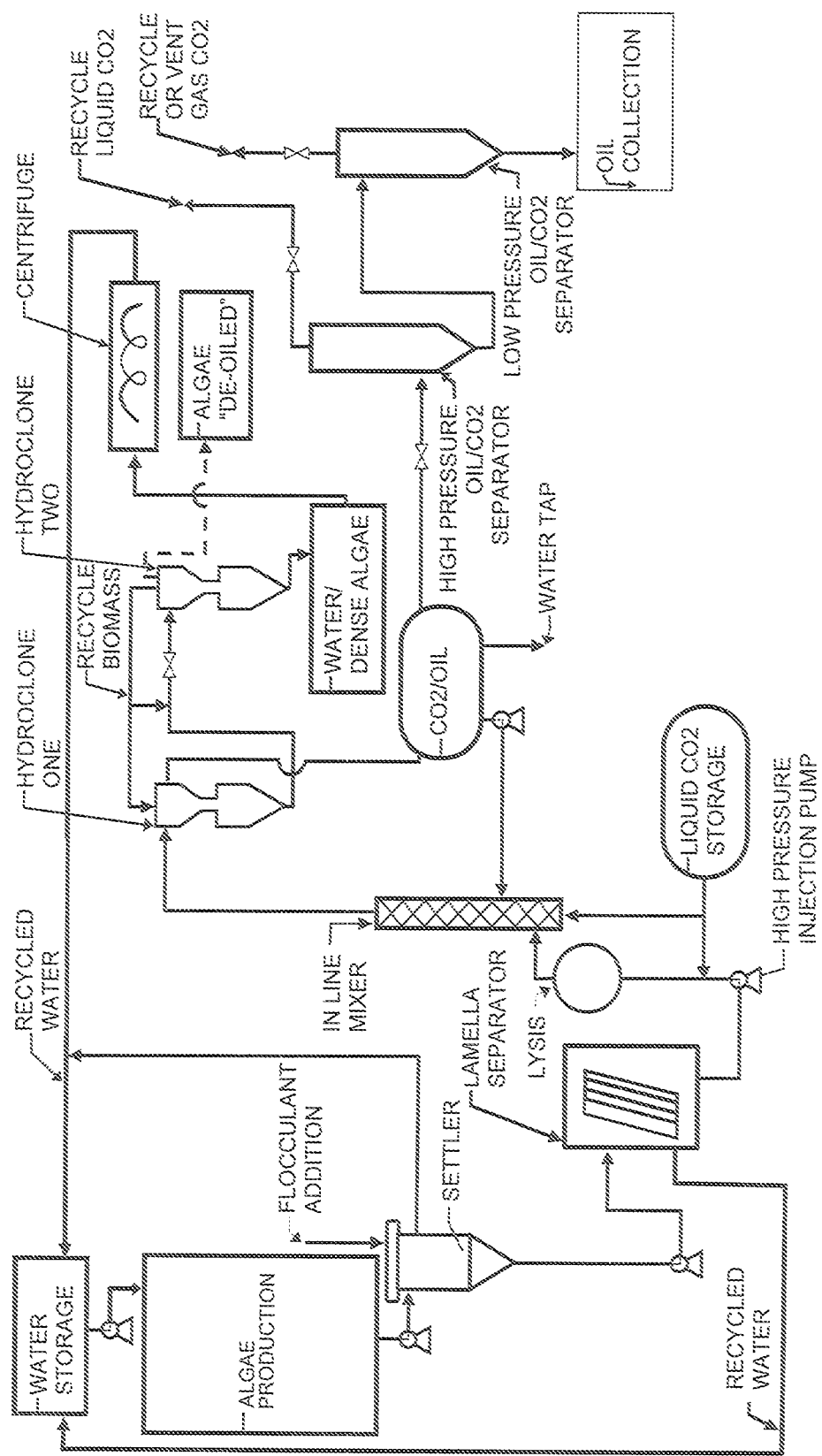
FIG. 10 is a pictorial representation of a process flow diagram for oil isolation from biomass and water.

The first step in the development of a commercial process is to design a process flow sheet to be implemented to isolate lipid effectively from algal biomass using a $CO_2$ solute as shown in FIG. 10. In order to examine these steps, upstream generation and concentration of algae are included in order to provide materials for the downstream $CO_2$ solute based oil separation.

The upstream steps of algal growth and flocculation are required for obtaining algal biomass for subsequent downstream processing with $CO_2$ solute (see FIG. 10). The first step is growth of the *Chlorella* strain shown in Example 4 up to 50 liters at a concentration of 2 g/L (0.2%). This growth stage generates 100 grams of algal biomass to be processed downstream. This biomass is concentrated 10 fold next in a settler by pH induced flocculation combined with addition of small amounts of polymer flocculant as needed. The water is then removed leaving 5 liters of concentrated and flocculated algal biomass at a design goal concentration of 2% biomass. This flocculated biomass in liquid media is then be passed along to a lamella separator for further concentration of the algal slurry and more dewatering to reach a design goal of 20% biomass by weight. The flocculated algae settles on the plates and is removed as a slurry at the bottom with the water removed through a weir at the top. The advantage of the lamella separator is that there are no moving parts and the process is relatively low in maintenance. As a result, the downstream processing stage is commenced with a 20% algal slurry in 0.5 liters or 500 ml of spent media, containing mostly water. If this concentration proves too dilute in order to perform a useful process, an alternative method to concentrate biomass to 20% biomass followed by a screw conveyor for transport and mixing with solute $CO_2$ can be used.

Once the biomass has been concentrated to 20% algal biomass in a lamella separator, the downstream processing steps are implemented for purification of liquid oils using $CO_2$ as a solute (see FIG. 10). Following concentration in the settler, the algal biomass is lysed before or after the introduction of liquid $CO_2$ solute. A process based on sonication disruption is initial approach but multiple methods are capable of cell lysis. It should be noted that the application of liquid $CO_2$ solute may serve to enhance lysis of the cells or make the algae membranes more permeable to oil removal in the following steps.

A key is the introduction of the liquid $CO_2$ solute above 800 psia, where a single phase exists, before or after lysis. The initial amount of $CO_2$ is a 40% solution of $CO_2$ in the oil by volume. Fortunately, the $CO_2$ solubilizes primarily in the oil part of the biomass and is soluble in the water phase to a much lower extent. Furthermore, the $CO_2$ as a weak acid will lower the pH and defloculate the algae prior to mixing and removal of the oil in following steps. In order to provide sufficient interaction of the $CO_2$ solute and the oil-biomass-water stream, the two streams are thoroughly mixed using an in line mixer with no moving parts. Mixing in a pressure tank is also possible.

One concern with the process is that the oil will form a stable micro-emulsion in algal biomass. Recycling back the processed and purified oil containing $CO_2$ from previous runs (or oil from commercial sources in lab trials) to increase the oil extraction and break any possible microemulsion can assist in decreasing or disrupting micro-emulsions. Given a 20% algal feed with 50% oil content, a processing stream would contain 50 grams oil, 50 grams of biomass, and 400 grams of water. To this 500 grams oil-water-biomass mixture, 150 grams of oil content (with $CO_2$ dissolved at high pressure) are added. This recycle oil stream increases the amount of material processed from 500 to 650 grams, a change in processing material of only 23%-small in comparison to the 100 fold increases in processing that are associated with supercritical extraction. Furthermore, the recycling of purified streams is a common method in the chemical processing industries. Distillation, the most widely used separation process in the petroleum industries, involves the recycling of condensed distillate back into the column in the form of reflux for improved separation efficiency. Similar to distillation, the more oil that is recycled, the stronger the removal of oil but the less the total oil product that is harvested. The optimal oil reflux ratio is one of the parameters optimized.

Following addition of the $CO_2$ or $CO_2$ plus oil, the mixture is sent to a series of multiple (likely two) hydrocyclones. Hydrocyclones offer the advantages of centrifugal based separation but without the requirement of moving parts. A feed at high speed and high pressure is fed to the cyclone and then two streams are removed based on differences in density and viscosity. By adding in a $CO_2$ solute, the density difference between the three phases (oil, biomass, and water) is increased and the mixture viscosity is decreased in order to facilitate cyclone-based separation. As shown, addition of $CO_2$ led to the accumulation of oil at the top followed by a light biomass-oil phase, and finally a water and dense biomass phase at the bottom. Therefore, the first cyclone separates the oil-$CO_2$ phase from the biomass and water phases. The effluent from the bottom of the hydrocyclone is either recycled for more passes through the first hydrocyclone or fed to a second hydrocyclone. The effluent from the top, which is oil with significant dissolved $CO_2$ represents the target oil product stream. A fraction of the stream represents the product oil "distillate" product while another fraction of the product steam is refluxed to the in line mixer to improve oil recovery from subsequent feeds. The final product "distillate" oil is depressurized in two successive tanks with the $CO_2$ captured and recycled as a solute as used as feed to the algae production stage. The second hydrocyclone separates the oil-biomass layer (top) from a lower water stream together with dense protein-rich biomass. The oil-biomass is then be recycled back to either the first hydrocyclone to improve oil removal recovery or to the second cyclone for removal of more water. The lower water-dense biomass stream from the second cyclone is sent to a final centrifuge or settler as needed to separate the water and de-oiled dense biomass. The water is then salvaged and returned to the algae production stage and the de-oiled algae used an animal feed, for methane, or burned for energy as shown in FIG. 10.

Example 9

Generating Biomass for Downstream Unit Operations for Oil Isolation from Biomass and Water While the major goal is innovative downstream separation process, 100 grams of biomass is regularly supplied in order to optimize the downstream processing unit operations. *Chlorella* cells can grow in the range of 1 to 2 grams per liter (or 0.2% algae). In order to obtain 100 grams of algal biomass at 0.2%, we must generate 50 liters of algal culture. As shown, *Chlorella* can also attain a lipid content approaching 50% when grown under heterotrophic conditions with glucose as a substrate. Bioreactors capable of these culture volumes with the deliverable of 100 grams of algal biomass in 50 liters of medium grown heterotropically with a 50% oil content may also be used.

After growing the algae, the next step will be to concentrate the algal biomass from 0.2% to 2% using flocculation combined with an in line settler. Unfortunately, algae settle very slowly as individual cells due to the high oil content and small radius. Flocculation may be needed in order to increase the density of the algae so that the material can be easily dewatered. It was previously observed that algae can be made to flocculate by increasing the pH to above 10.0 by addition of sodium hydroxide in a medium containing calcium and phosphate. This approach is advantageous for two reasons: (1) Flocculation with pH is reversible. It is possible to reverse the flocculation in subsequent steps through the incorporation of an acid, liquid $CO_2$ at high pressures, as desired, if single cells are better for the oil recovery; and (2) Flocculation with pH change is inexpensive and requires a minimum of chemicals. A small amount of polymer additive can be included as needed to accelerate the flocculation step. Following pH change, the flocculated algae will be sedimented in a settling tank. Water is then decanted off the top and the settled flocs are removed as a slurry from the settling tank. Thus, an algae stream concentrated from 0.2% to 2% with the volume of water lowered from 50 liters down to 5 liters for transfer to the lamella separator is obtained.

If too much water is present, the oil is too dilute to perform an efficient hydrocyclone separation. Consequently, the biomass can be concentrated from the settler as needed in another dewatering step using a lamella settler. Lamella separation devices fractionate a sedimentable slurry at the bottom from an aqueous effluent stream at the top. These devices can achieve a 10 fold concentration desired for water reduction. The water stream at the top is returned to the algae feed for use in the following algae growth stage. The slurry will be removed for lysis, and pressurized for solubilization of $CO_2$. The lamella operating conditions that maximize removal of water from the 2% biomass feed can then be determined. A plot of flow rate and recycle ratio (return/effluent) versus biomass weight fraction in the effluent to the next stage is generated. Ideally, a 20% concentrated biomass at the lowest possible recycle ratio is obtained.

The ability to process a number of different algae streams is desirable thus, algal feeds from additional sources will also be processed. In this case, the following processing steps may be modified including $CO_2$ solute levels and oil recycle as needed to optimize harvesting and oil collection from the target algae. The method in this case is an algal process that is flexible for using multiple algae stream inputs.

Following harvesting and concentration, lysis of the algal particles is likely required to break the cell membranes and allow the removal of entrapped oil particles using liquid $CO_2$ and recycled oil. For this process, a sonication device, which can be placed in line with the process flow system may be used. Sonication generates sound waves that propagate into the liquid media resulting in alternating high-pressure and low-pressure cycles. During the low-pressure cycle, high-intensity small vacuum bubbles are created in the liquid. When the bubbles attain a certain size, they collapse violently during a high-pressure cycle causing cavitation. During the implosion shear forces break the cell structure mechanically and facilitate oil transfer. Furthermore high pressure cycles of the ultrasonic waves support the diffusion of solutes so that the presence of a sonication device may facilitate the diffusion of $CO_2$. Thus, options to add $CO_2$ or oil before and after sonication depending on the equipment's capabilities are provided. Algal lysis using standard lysis assays such as microscopic stains as a function of sonication power and liquid flow rate may be employed. By combining sonication with high pressure $CO_2$ and recycled oil, the conditions favorable to removal of oil from biomass are created. If difficulties are encountered with continuous in line sonication at laboratory scales, the sonication is performed in batch and then the lysed algae are incubated with $CO_2$ solute. Also, the role of high pressure $CO_2$ as an option for facilitating lysis independently and together with other lysis methods is assessed.

Example 10

Optimization of Downstream Unit Operations

Parameter Optimization of Hydrocyclone One: Oil, Biomass, and Water.

The laboratory unit operation is capable of handling 100 grams of lysed algae in 500 grams water/spent media. Liquid $CO_2$ solute is included to lower the density and viscosity the oil and enhance the process separation (see FIG. 2). The pressure is maintained above 800 psia using a feed pump in order to maintain $CO_2$-oil as one liquid phase. This mixture is fed to a cyclone and two process streams collected. The initial focus is on collecting an oil phase separated from a biomass and water phases. Fortunately, small hydrocyclone units are available for separating oil-water mixtures. The device is modified as needed to accommodate the high pressure operations associated with using liquid $CO_2$.

As stated previously the processing rate Q is dictated by equation 1.

$$Q = \left\{ \frac{2r^2(\rho - \rho_0)}{9\mu} \right\} \left[ \frac{\pi L(R_0^2 - R_1^2)\omega^2}{\ln\left(\frac{R_0}{R_1}\right)} \right]. \quad (1)$$

A number of operating parameters are varied in order to obtain optimum operation.

As shown in the previous results, viscosity can be reduced and the density difference can be increased by increasing the amount of incorporated $CO_2$. The separation efficiency increases as the difference in density increases. A similar effect is shown for decreasing viscosity. The density and viscosity of the oil layer are varied through variation of the pressure of the $CO_2$ fed into oil-water-biomass mixture. It is determined whether the amount of oil extracted out the top improves by increasing the $CO_2$ content. A plot of the amount of $CO_2$ incorporated versus oil harvested is generated in order to determine the ideal $CO_2$ pressure and solute concentration to use.

Separation efficiency is highest with large oil droplets. Very small droplets are more difficult to separate. By increasing the amount of oil in the feed, the oil droplet size is increased. Therefore, the next step is to supplement the feed with recycle oil and $CO_2$ back in increasing amounts and evaluate its effect on the oil droplet size and efficiency of oil collected. Initially, 50 grams oil, plus 50 grams biomass, plus 500 grams water are used and increasing amounts of recycled oil are added and the impact on separation is measured. As needed, the recycled oil from fed oil is differentiated by using a different chemical composition and the amount of target oil extracted is measured. The oil recovery increases with more recycled oil but there is a diminishing improvement in the removal efficiency after a certain amount of recycled oil. The efficiency of oil collected as a function of amount of recycle oil added is then analyzed.

With hydrocyclones, the separation efficiency increases with the flow rate. This is because the flow rate into the cyclone is directly proportional to the angular momentum. A plot of flow rate versus oil removal efficiency for the laboratory model system is generated. In addition, the biomass-water stream can be returned to the cyclone for a second round of oil extraction. The extent to which returning the effluent from the lower stream can be used to improve oil removal efficiency is examined. A plot of recycle ratio (from 0 to 1) as a function of total oil removal efficiency is constructed. Once again, it is likely that a single pass return will improve efficiency but that efficiencies decline as the amount recycled increases.

The analysis indicates whether the lipid is sufficiently pure and contains significant amount of neutral lipids. Next, the water and biomass phases are analyzed in order to determine if there is additional oil remaining in the water and biomass phases. If additional oil remains, a second lipid polishing step may be required in which additional $CO_2$ is added in order to remove a second layer of lipids from the water and biomass. In addition, it is determined whether the water phases and the biomass phases are distinct enough to allow these components to be separated into separate phases. Alternatively, if the water and biomass are not sufficiently isolated, an additional step to isolate most of the remaining water from the biomass may be added. If the biomass-water cannot be easily separated with $CO_2$, an alternative method, such as filtration, for separating the water may be added. The nutritional content of biomass that is remaining after removal of the lipid is also examined in order to determine if it is appropriate for feeding to shrimp or other animals.

Figure 11:
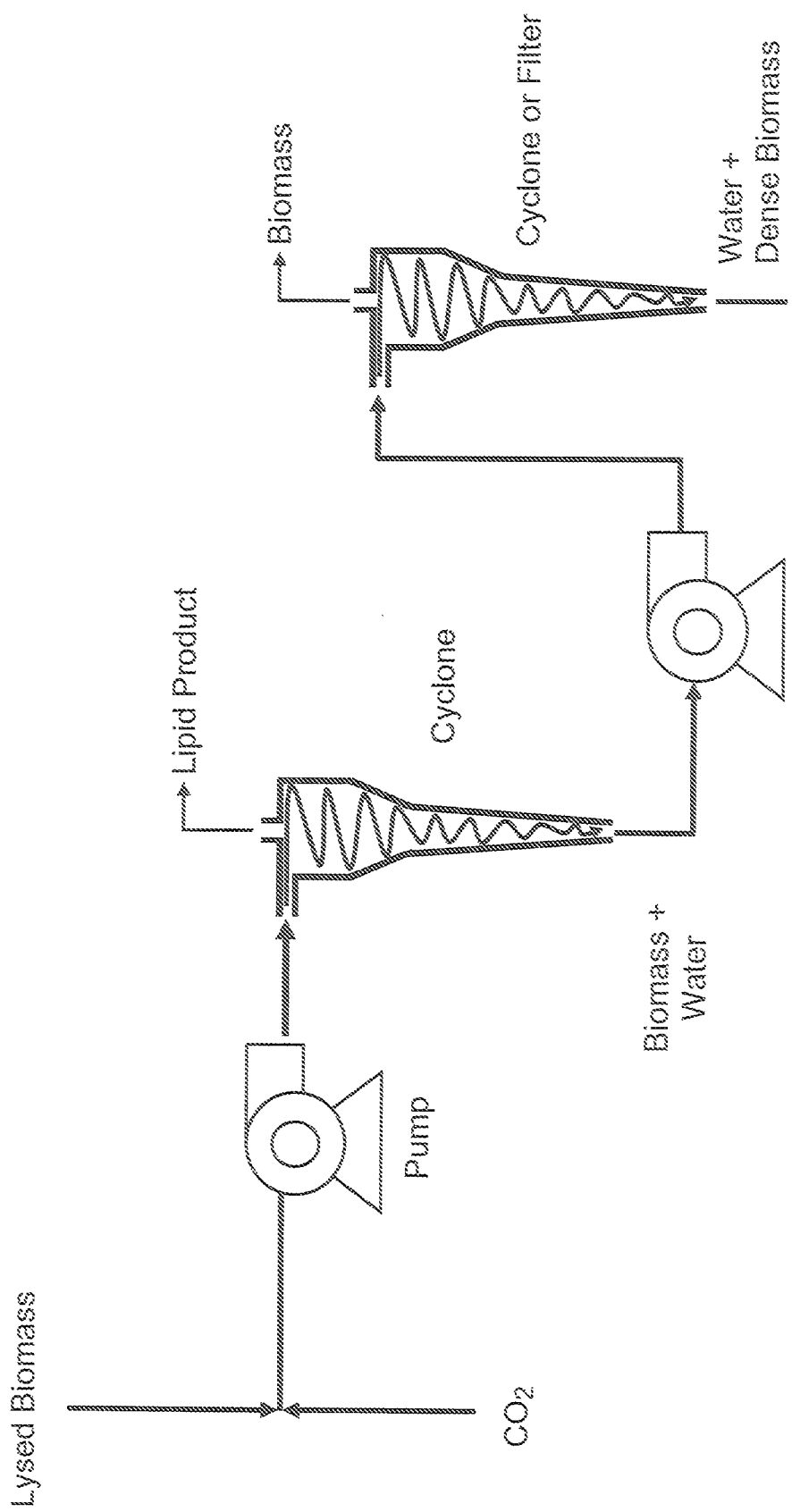
FIG. 11 is a pictorial characterization of a flow diagram depicting sequential hydrocyclones for lipid separation from algae biomass.

Results showed the presence of a biomass layer below the oil-$CO_2$ layer and above the water-dense biomass layer. Therefore, the next unit operation to be optimized is a second hydrocyclone for the separation of algal biomass and a lower water phase plus dense biomass (FIG. 11). Due to residual oil content and $CO_2$ solute, much of the algal biomass is at a lower density than the water. This algal biomass is separated using a second hydrocyclone and as needed recycled to the first or second cyclone. It is estimated that 80% of the oil is removed so that 10 grams of oil plus 50 grams of biomass plus 500 grams of water are fed to the second cyclone. The less dense biomass will be obtained as the upward stream and the water plus dense biomass as the lower effluent. The lighter effluent will be sent either to the final algae stream or, if the oil content remains high, will be sent to the first cyclone for removal of residual oil. The effect of $CO_2$ content and pressure are examined to determine if increased $CO_2$ solute improves biomass isolation from water. $CO_2$ content (or pressure) versus biomass recovery is analyzed. The other parameter to be considered will be flow rates and recycle ratios in order to maximize biomass recovery. The bottom portions, including water and heavier biomass, are sent to a final centrifuge.

Hydrocyclones can require flow streams and speeds that may potentially be large for laboratory operation. If flow in a hydrocyclone is problematic, operating parameters including $CO_2$ concentration and oil recycle amount are optimized using a high pressure batch centrifuge and, if these parameters are appropriate in larger flow trials with the hydrocyclone, they are further examined.

After the second cyclone, the heavier, oil-free biomass, and the water are centrifuged in order to separate water from the algae protein material. This is a straightforward separation in which the heaviest biomass is considerably denser than water. In addition, $CO_2$ is released and captured for recycle to feed the algae or used again in the separation process. The rate at which algae settles depends on the angular momentum of the centrifuge. The parameters for this step are rotational speed as a function of water recovery. Higher speeds lead to faster recovery time but will increase costs. Alternative recovery methods such as settling tanks may also be used as low cost alternatives.

Once hydrocyclone operation is optimized, the amount of recycle oil and $CO_2$ pressure that must be mixed with the algal-water feed is specified. As noted above, the efficiency of the hydrocyclone is dependent on the size of the oil droplets, with larger oil droplets facilitating improved separation. Therefore, it is important to mix the recycled oil with the lysed algal biomass as well the $CO_2$ in order to create larger droplets and break the oil emulsion present in the algal biomass. This is accomplished using one or more in line static mixers. The major parameter to vary is the feed rate to the mixer and recycling for improvement of mixing may also be considered. Oil droplet size and amount of $CO_2$ solubilized as a function of feed rate into the mixer is examined. Oil droplet size can be measured microscopically and $CO_2$ incorporated is measured by releasing the pressure and measure volume change.

If the in line mixer requires flows that are high for laboratory scale, the recycled oil, algae, and $CO_2$ are first mixed in a dedicated pressurized mixing tank with an agitation system. Once the optimal mixing conditions are created, the mixing tank can be combined with an in line mixer or the product fed directly to the hydrocylones.

The final stage in the $CO_2$ solute process includes a chamber in which the $CO_2$ is released from the oil and the oil is collected as final product. Disclosed herein are two chambers: 1) The first chamber depressurizes to below the cloud point as shown previously results. The liquid $CO_2$ phase is then harvested in the upper return and the oil from the lower part of the tank. The liquid $CO_2$ phase is re-used as solute following supplementation with additional $CO_2$ and re-pressurization. The parameters that are evaluated are the removal rate of liquid and gas $CO_2$ from the chamber and the pressure to be used for $CO_2$-oil phase separation. The liquid oil stream is sent to a second depressurization chamber. The second depressurization chamber functions to lower the pressure to below the bubble point and the $CO_2$ is harvested as a gas and then recycled as feed to algae growth tank. The oil emerging from the bottoms will represent the target product "distillate" for generating biodiesel or other products. Given that $CO_2$ will emerge as a gas, there will likely be considerable foaming. Thus, the critical parameter measured is the $CO_2$ gas removal rate, which is limited in order to minimize foaming.

Example 11

Process Integration of Upstream and Downstream Unit Operations

This example demonstrates integration of oil separation from algae grown in aqueous media into a continuous laboratory scale oil isolation plan. The basis is isolating oil from 100 grams of algal biomass containing 50% oil in 50 liters of media broth.

A continuous process is implemented using cyclones or a centrifuge operating at the optimal dissolved $CO_2$ levels. High-pressure cyclones and centrifuges are available that can be easily adapted to separations with dissolved $CO_2$. The phase behavior dictates the number of stages and the number of cyclones/centrifuges used. The phase diagram and the settling characteristics, initially dictate whether a single step process or multi-step process is conducted. A three-phase system likely results in a one-step separation process (i.e., a cyclone with three exit streams). Alternatively, pair of stages, where lipid first is removed from water and biomass, then water and biomass are separated (FIG. 11) may be employed. A final filtration stage may be used to remove the residual water from the biomass that is then available as a feedstock for shrimp or other purposes. The biomass is then concentrated in the proper water content and lysed separately. Next, the slurry together with $CO_2$ is pumped up to a high pressure and then pumped into a cyclone. The rotation speed of the cyclone or cyclones in order to achieve separation of lipids from biomass and water from biomass is determined. Another parameter that is examined is the pump pressure required to ensure dissolution of sufficient $CO_2$ in the apparatus. If filtration of biomass is required, a continuous filtering system may be employed.

The critical processing step is the separation of oil and biomass-water in hydrocyclone one. Since the mixer is important for combining oil and $CO_2$ in proportions that can be fed into the hydrocyclone, the first step is incorporating the mixing unit. $CO_2$, recycle oil, and lysed algal biomass and water are fed to the mixer and the mixture is then continuously pumped into hydrocyclone one at specified inlet conditions. The $CO_2$-oil and water-algal streams are collected in order to demonstrate that the cyclone and mixer are operating successfully in conjunction. A sonicator may also be included in line, as needed, to increase mixing. The feed rates, pressures and recycle streams are adjusted, as required, to reach specifications. The result is separation of oil and water-biomass using a combined mixer connected to hydrocyclone one.

The second hydrocyclone responsible for processing the biomass-algal layers is next be incorporated. The biomass-water effluent from hydrocyclone one is either recycled to improve oil recovery or fed continuously to the second hydrocyclone through an in-line pumping unit. The oil-biomass stream is collected from the top of the hydrocyclone two and the water and dense biomass are collected from the bottom of hydrocyclone two. Some of the upper layer may be recycled to either to the first (for recovery of more oil) or second hydrocyclone (for removal of more water). The amount collected in each stream is measured to see if the amounts are equal to those obtained when the units are operated individually. An integrated process including mixer, hydrocyclone one, and hydrocyclone two with separate product streams of oil-$CO_2$, algal biomass, and water and heavy biomass is obtained.

The second hydrocyclone will likely result in a bottoms stream that contains water and de-oiled algae biomass. The effluent from the second hydrocyclone is passed to the centrifuge or settler for final processing. This step results in dewatered and de-oiled biomass and water together with an integrated process including mixer, two hydrocyclones, and a centrifuge.

The $CO_2$ solute is the critical solute needed to effect separation of the oil from other components in hydrocyclone one. Once separated, the $CO_2$ is removed, captured for recycle, and the oil recovered. Part of the oil-$CO_2$ mixture is recycled to the mixer for enhanced oil recovery. The remaining product stream is sent to an initial depressurizer to separate liquid $CO_2$ from liquid oil followed by a low pressure depressurizer to separate the remaining gaseous $CO_2$. A first unit at pressures below 800 psia such that the oil and liquid $CO_2$ separate and a second unit at near atmospheric pressure to release the $CO_2$ vapor from the oil are employed. A purified algal oil stream and the efficiency of recovery of this algal stream as a fraction of the concentration of the original oil in the algae is achieved. This efficiency is measured by comparison of the isolation process with hexane extraction as an alternative. The full integration of the downstream processing steps beginning at the in line mixer and culminating the oil product emerging from the depressurizer as shown in the flow diagram (FIG. 10) is attained. Recaptured $CO_2$ can be re-pressurized and returned to the liquid mixture.

The lamella separator and lysis steps are incorporated upstream of the mixing unit. The separator concentrates the algal biomass emerging from the flocculation tank from 2% to 20% and then the biomass is lysed using in line sonication. Inclusion of this step represents a complete integrated process since a settler is upstream will operate in semi-batch mode. Feed rate to the separator requires 100 grams of algal biomass to reduce 5 liters of water-biomass into 0.5 liters of 20% biomass for feed to the lysis equipment and in line mixer. The processing time is approximately 2 to 4 hours to process the inlet stream and thus the processing rate is approximately 2.5 liters per hours.

Full integration for complete $CO_2$ solute laboratory process that includes algal growth and finishes with a purified algal oil stream achieved as follows. The algae is initially grown up to 2 g/L (0.2%) in 50 Liters of culture. The algae is collected and then sent to the flocculation tank for concentration of 100 grams of biomass from 50 liters down to 5 liters. These two steps are done first as batch processes. The integrated process begins with a 2% flocculated algal feed in 5 liters of water/media emerging from the settling unit and then following the complete process as described in the process flow diagram. The capacity to process is 100 grams at a flow rate of 2.5 liters per hour of initial feed to the lamella separator. The separation of 50 grams of algal biomass from oil in 2 to 4 hours following the initial feed to the lamella separator is achieved. The final deliverable is the production of purified algal oil and yield of oil at the end of the integrated process. The total amount of oil recovered is measured and this total is divided by 50 grams oil fed in order to determine the yield of oil recovery in the complete process. Another yield calculation is amount of algal biomass remaining plus oil divided by 100 grams total to determine the total algal recovery yield per 100 grams of feed. Multiple runs are performed with varied input parameters in order to ensure process robustness. Some of the parameters varied include the percent of oil in the algal feed between 30 and 50%. Alternative algal species may also be employed. Another parameter that is varied to ensure product robustness is the concentration of biomass in water emerging from the lamella separator. By altering the rate of withdrawal of water from the separator, process flexibility by altering the biomass content between 10 and 40% is examined. If the concentration of biomass can be increased without loss of yield, then the process may be conducted at a higher density of biomass to water and this results in lower process sizing requirements. Comparison of the amount of oil harvested for 100 grams of oil feed to a process in which the oil is extracted using the conventional hexane extraction technique may be used, for example, as an in-process control. Such a comparison enables a determination as to how effective $CO_2$ solute based oil isolation is as compared to the traditional extraction process for algal oil harvesting.

The process is designed to handle 100 grams of algal biomass in 50 liters (13 gals) of growth media. This method can process the resulting oil in 2 hours or alternatively 1200 grams in 24 hours. A 200- and then 2,000-fold scale up that process approximately $2.4 \times 10^5$ gram or 0.24 metric tons per day are possible. Current design estimates approximate algae farms that can generate about 100 metric tons per hectare per year, which corresponds to approximately 0.27 metric tons per day. Thus, this scale up process can accommodate processing from a 1 hectare pilot scale facility with a pilot product stream of 20 gallons of oil per day. The process can be scaled 10 fold again for a 10 hectare (25 acre) algal field.

Equipment is designed based on the laboratory scale unit operation measurements and expanding the process by 200 and 2000 fold. Two different alternatives are considered for scaling up processing. Larger pumps and cyclones may be used as multiple pumps and cyclones in parallel. Another alternative is to increase the pumping rate into the cyclone in order to increase the angular momentum and increase the material Q processed according to equation 1. A process that has negligible waste product for long-term sustainability by generating oil for biodiesel, using the biomass for animal feed, and recycling the water and $CO_2$ is demonstrated.

Although the invention has been described with reference to the above example, it will be understood that modifications and variations are encompassed within the spirit and scope of the invention. Accordingly, the invention is limited only by the following claims.

What is claimed is:

1. A method for the isolation of oil from microorganisms in aqueous media comprising:
   (a) adding pressurized carbon dioxide ($CO_2$) at a pressure of at least about 800 psia and below the critical pressure as a solute to the medium containing the microorganisms,
   wherein $CO_2$ is dissolved in the media;
   (b) lowering the pressure of the $CO_2$ to a sufficient amount to allow the media containing the microorganisms to separate into at least two distinct phases, wherein one of the two phases comprises an oil rich phase and the other phase comprises a water and microorganism rich phase; and
   (c) removing the oil rich phase, thereby isolating the oil from the microorganisms of which are selected from the group consisting of *Athrospira, Chlamydomonas, Chlorella,* Chlorophyceae, *Crypthecodinium,* Cyanophyceae, *Dunaliella, Haematococcus, Nannochloropsis, Scenedesmus, Schizocytrium, Synechococcus,*

*Synechocystis, Thaustochytrids, Ulkenia* and algae that is genetically engineered to enhance or alter lipid production.

2. The method of claim 1, wherein the microorganisms are optionally lysed or ruptured.

3. The method of claim 1, wherein the microorganisms are intact cells.

4. The method of claim 1, wherein the oil is a lipid.

5. The method of claim 4, wherein the lipid is neutral.

6. The method of claim 5, wherein the lipid is used for biofuel production.

7. The method of claim 1, wherein the amount of $CO_2$ added to the media containing the microorganisms is at a volume below which $CO_2$ is a solvent.

8. The method of claim 1, wherein additional bioproducts are optionally isolated or secreted from the microorganisms.

9. The method of claim 1, further comprising a centrifuge, a cyclone, or other phase separating device for phase separation.

10. The method of claim 1, wherein the source of the $CO_2$ is selected from the group consisting of a coal-fired power plant, ethanol biorefinery, and other industrial source.

11. The method of claim 1, wherein the $CO_2$ is removed from the oil phase.

12. The method of claim 1, wherein the aqueous phase is recycled as growth medium for photosynthetic microorganisms.

13. The method of claim 1, wherein the oil obtained in (b) is recirculated back to the media containing the microorganisms to increase separation efficiency therein and isolate additional oil from the microorganism.

14. The method of claim 1, wherein the media of step (b) containing the microorganisms separates into at least three distinct phases, wherein the first is said oil rich phase, the second is a water phase, and the third is a microorganism rich phase.

* * * * *